United States Patent [19]

Sugiyama et al.

[11] Patent Number: 4,766,666
[45] Date of Patent: Aug. 30, 1988

[54] SEMICONDUCTOR PRESSURE SENSOR AND METHOD OF MANUFACTURING THE SAME

[75] Inventors: Susumu Sugiyama; Takashi Suzuki; Mitsuharu Takigawa, all of Aichi, Japan

[73] Assignee: Kabushiki Kaisha Toyota Chuo Kenkyusho, Aichi, Japan

[21] Appl. No.: 911,245

[22] Filed: Sep. 24, 1986

[30] Foreign Application Priority Data

Sep. 30, 1985 [JP] Japan .................. 60-217672
Sep. 30, 1985 [JP] Japan .................. 60-217673
Sep. 30, 1985 [JP] Japan .................. 60-217674

[51] Int. Cl.$^4$ ............... G01L 7/08; G01L 9/06; H01C 17/00
[52] U.S. Cl. .................. 29/610 SG; 29/454; 73/721; 73/727; 73/DIG. 4; 338/4
[58] Field of Search .......... 73/DIG. 4, 727, 720, 73/721, 726; 29/610 SG, 454, 610 R; 338/4, 42

[56] References Cited

U.S. PATENT DOCUMENTS

| | | | |
|---|---|---|---|
| 3,858,150 | 12/1974 | Gurtler et al. | 29/610 SG |
| 4,003,127 | 1/1977 | Jaffe et al. | 29/610 SG |
| 4,188,258 | 2/1980 | Mounteer et al. | 29/610 SG |
| 4,432,007 | 2/1984 | Cady | 73/724 |
| 4,618,397 | 10/1986 | Shimizu et al. | 29/610 SG |
| 4,670,092 | 6/1987 | Motamedi | 29/610 SG |

Primary Examiner—Donald O. Woodiel
Attorney, Agent, or Firm—Koda and Androlia

[57] ABSTRACT

A semiconductor pressure sensor composed of a substrate formed adopting a thin-film forming technique and a diaphragm which is formed on the surface of the substrate. The sensor includes an insulating diaphragm film which is formed of an etching-resistant material on the main surface of the semiconductor substrate such as to coat it, at least one etching hole provided such as to penetrate the diaphragm film and reach the substrate, a reference pressure chamber which is formed by etching to remove a part of the semiconductor substrate and a disappearing film through the etching hole, and at least one strain gage which is provided at a predetermined position in the pressure receiving region of the diaphragm film. All the processing steps of the sensor are conducted solely on the main surface of the semiconductor substrate, namely, on a single side. Therefore, it is possible to manufacture the sensor itself utilizing the substantially same technique as the known integrated circuit manufacturing technique and to form the diaphragm with a predetermined thickness such that it may process a thin and precisely dimensioned thickness.

10 Claims, 16 Drawing Sheets

SEMICONDUCTOR PRESSURE SENSOR AND METHOD OF MANUFACTURING THE SAME

BACKGROUND OF THE INVENTION

1. Field of the Invention

The present invention relates to a semiconductor pressure sensor and, more particularly, to an improved semiconductor pressure sensor which is capable of forming a diaphragm on the substrate thereof using a thin-film forming technique.

2. Description of the Prior Art

[Structure]

FIG. 8 shows the general structure of a conventional semiconductor pressure sensor. This semiconductor pressure sensor includes an N-type silicon substrate 10 and a pedestal 12. The substrate 10 is etched from the back side so as to form a diaphragm 14 about 20 to 50 μm in thickness in the central portion of the substrate 10. The substrate 10 is adhered to the pedestal 12 at the thick-walled portion on the back side so as to form a reference pressure chamber 16 therebetween.

On the upper side of the diaphragm 14 of the N-type silicon substrate 10 strain gages 18 consisting of P-type resistance regions are formed by diffusion or ion implantation. On the upper surface of the substrate 10, insulating film 20 of silicon oxide or the like and electrodes 22 are formed.

According to the semiconductor pressure sensor having the above-described structure, the diaphragm 14 is deflected in proportion to the pressure being measured, and this deflection is detected as a change in resistance of the strain gages 18, whereby the pressure is measured.

In order to measure an absolute pressure by means of the semiconductor pressure sensor, the reference pressure chamber 16 provided between the substrate 10 and the pedestal 12 is made vacuum.

Thus, the diaphragm 14 is deflected in proportion to the absolute pressure applied to the surface thereof, and the deflection is electrically measured as a change in resistance of the strain gages 18.

When a differential pressure is measured by means of the semiconductor pressure sensor, a pressure introducing hole 24 which communicates with the reference pressure chamber 16 is provided in the pedestal 12, and the diaphragm 14 is deflected in correspondence with the difference in the pressure applied to the upper side and the underside of the diaphragm 14. Thus, a difference pressure is measured in a similar way to that of the absolute pressure type sensor.

In such a conventional type of sensor, the diaphragm 14 and the reference pressure chamber 16 are provided by means of backside-etching. When the substrate 10 is etched in this way, an anisotropic etching process using potassium hydroxide (KOH) water solution, etc. is widely adopted.

The reason for this is as follows. Since the etching speed on the plane (111) is very slow during etching, a (100) or (110) silicon substrate is used to form an etching mask of silicon nitride (Si$_3$N$_4$) or the like on the under surface of the substrate 10, so that etching in the vertical direction proceeds in a tapered configuration having a regular angle $\theta$ of inclination. Thus, the diaphragm 14 and the reference pressure chamber 16 shown in FIG. 8 are formed.

The aforementioned conventional semiconductor pressure sensor, however, has several problems remaining to be solved which will be described in detail in the following, and effective countermeasures have been demanded.

(a) Since both surfaces of the silicon substrate 10 must be subjected to wafer processing, the processing steps become very complicated.

As described before, when the semiconductor pressure sensor is fabricated, it is necessary to form the strain gage 18s, the insulating film 20 and the electrodes 22 on the upper surface of the substrate 10, and to subject the under surface thereof to etching masking and anisotropic etching in order to form the diaphragm 14.

Since such wafer processing on both sides of the substrate 10 requires photoecthicn process for each step using a both-side alignment device and each processing step inevitably becomes complicated.

Even if such a both-side alignment device is used, an error is produced to a certain extent when positioning the strain gages 18 in alignment with the peripheral portion of the diaphragm 14, such error causing non-uniformity in the sensitibity of the sensor.

Generally, a torelance of about 5 μm is allowed in double-sided alignment when a 300 μm-thick silicon substrate is used. The magnitude of errors in alignment increases with increase in the thickness of the silicon substrate. Especially when a large-diameter silicon wafer is used, the characteristics of each sensor vary greatly, so that mass production of such sensors is very difficult.

(b) It is difficult to reduce the thickness of the diaphragm 14 of the conventional semiconductor pressure sensor.

In the conventional semiconductor pressure sensor, as is known, a diaphragm 14 of desired thickness is formed by adopting a method wherein etching is stopped at a time obtained by calculation on the basis of the etching speed in the direction of the depth of the silicon substrate 10.

However, this etching speed varies depending on the surface condition of a wafer or the number of wafers and, in addition, the thickness of the substrate 10 itself is not uniform even though it may fall within a predetermined tolerance range. As a result, it is inevitable that the thickness of the diaphragm 14 formed by such etching process is not sufficiently uniform even though it may fall within the predetermined tolerance range.

Generally, it is necessary to allow for an error of about 2 μm when the diaphragm 14 of 20 to 50 μm thick is formed.

The sensitivity of a semiconductor pressure sensor is inversely proportional to the square of the thickness of the diaphragm. Therefore, the sensitivity of the pressure sensor varies closely in accordance with any error in the thickness of the diaphragm.

Consequently, the thickness of the diaphragm 14 of the conventional semiconductor pressure sensor is at least about 5 μm, which makes it impossible to obtain a sensor displaying high-sensibility.

(c) It is difficult to make the dimension of the diaphragm 14 small in a conventional semiconductor pressure sensor.

The dimension of the diaphragm 14 is determined by the dimension of the etching mask provided on the under surface of silicon substrate 10, the thickness of the silicon substrate 10, the depth of etching in the vertical direction during etching, and so forth.

When the diaphragm 14 is formed by anisotropic etching, etching proceeds inwardly from the periphery of the opening of the etching mask in a tapered configuration in accordance with the regular angle $\theta$ of inclination which is determined by the crystalline orientation, and the frustoconical reference pressure chamber 16 which is surrounded by the plane (111) is finally obtained.

The dimension of the diaphragm 14 formed as a result of such etching is determined by the dimension of the opening of the etching mask and the depth of etching in the vertical direction of the silicon substrate 10.

However, since it is necessary to allow for variation in the thickness of the silicon substrate 10 within a predetermined tolerance range at the beginning of etching, it is necessary to correct the depth of etching in the vertical direction of the substrate 10 by an amount equivalent to the difference in thickness by increasing or decreasing the depth of etching by that amount.

Consequently, it is inevitable that the depth of etching in the vertical direction of the substrate 10 varies within a predetermined tolerance range and, hence, the final dimension of the diaphragm 14 also varies within the predetermined tolerance range in correspondence with the variation in the depth of etching in the vertical direction.

If the variation of the thickness of the silicon substrate 10 is $\Delta t$, the variation of the dimension of the diaphragm is represented by $2\Delta t/\tan \theta$.

Accordingly, if it is assumed that, for example, the (100) plane silicon substrate 10 is used and a diaphragm of a rectangular shape having its sides disposed in the direction (110) is formed, the angle of inclination is about 55 degrees, and since it is necessary to allow about 10 $\mu$m for the variation in the thickness of the diaphragm 14, the final dimension of the diaphragm 14 has a scattering of about 14 $\mu$m.

As a result of this predetermined degree of variation of the diaphragm 14 formed by etching, the relative position of the periphery of the diaphragm 14 and the strain gage 18 varies. The amount of strain applied to the gages 18 is therefore varied, thereby producing variation in the sensitivity of the sensor itself.

In addition, since the degree of dimensional variation increases with the reduction in the dimension of the diaphragm 14 in the conventional semiconductor pressure sensor, the permissible dimension of the diaphragm 14 is at least 500 $\mu$m in diameter or breadth. It is thus inconveniently impossible to make a sensor having a smaller diaphragm 14.

(d) It is necessary to adhere the silicon substrate 10 to the pedestal 12 in an airtight state to form the reference pressure chamber 16 in the conventional semiconductor pressure sensor.

When an absolute pressure is measured using the sensor, it is necessary to use a vacancy formed between the adhered substrate 10 and pedestal 12 as the reference pressure chamber 16 and to maintain the pressure within the reference pressure chamber 16 at a vacuum.

However, techniques for airtight adhesion of high efficiency such as, for example, anode bonding and glass bonding are necessary for adhering the substrate 10 to the pedestal 12. Furthermore, if there is the slightest leakage at the junction, the output characteristic of the pressure sensor varies over time.

In particular, in a sensor for measuring a pressure with high accuracy, the airtight adhesion technique employed is critical, which mitigates against the mass production of sensors.

The conventional semiconductor pressure sensor has the problems (a) to (d) described above. These problems make it difficult to enhance the measuring accuracy, to miniaturize a sensor, and to provide mass-produced and, hence, low-cost sensors due to the complicated processing steps.

As a result, in spite of the efficient performance of the conventional semiconductor pressure sensor, it has not yet been brought into general use, and an effective way of dealing with this drawback has become highly desirable.

Semiconductor pressure distribution detecting apparatus consisting of a plurality of semiconductor pressure sensors arrayed in matrix have been known and been widely used for dynamically detecting various pressure distributions, because they can detect dynamic change in pressure simultaneously at a plurality of points.

One of the proposals made with respect to such semiconductor pressure sensors is the pressure distribution detection apparatus disclosed in IEEE Trans. Electron Devices. Vol. Ed - 32, p. 1196, 1985, which is composed of a plurality of sensors integrally provided on a substrate.

FIG. 26 shows an example of this pressure distribution detecting apparatus. The detecting apparatus is composed of a silicon substrate 10, a glass pedestal 13, a frame body 15, and a plurality of electrostatic capacitance type semiconductor pressure sensors 200 arrayed on the silicon substrate 10 in a matrix of n rows $\times$ m vertical lines (hereinunder referred to simply as "lines").

Each of the semiconductor pressure sensors 200 includes the diaphragm 14 formed by removing the upper surface and the under side of the substrate 10 by etching, and the reference pressure chamber 16 formed by closely bonding the substrate 10 with the glass pedestal 13 at the thick-walled portion on the back side of the substrate 10. A first electrode 25 and a second electrode 27 are opposed within the reference pressure chamber 16.

The frame body 15 is adhered to the silicon substrate 10 at the thick-walled portion on the top side. A plurality of pressure introducing holes 17 for applying pressure to the diaphragm 14 of each sensor 200 which is arrayed in a matrix are formed on the frame body 15. The top side of the frame body 15 is covered with a coating 19.

When a pressure is applied from the top side of the frame body 15 of the apparatus having the above structure, the pressure is applied to the diaphragm 14 of each sensor 200 through the pressure introducing hole 17 and is detected as a change in electrostatic capacity between the first electrode 25 and the second electrode 27.

Thus, since a plurality of semiconductor pressure sensors 200 are integrally provided on the same silicon substrate 10, it is possible to array each sensor 200 in a dense matrix, so that the resolution for two-dimensional detection of distribution of the applied pressure is as good as 2 mm.

This pressure distribution detecting apparatus, however, has the following problems as well as the aforementioned problems (a) to (d), and an effective way of overcoming them countermeasure has been demanded.

(e) In this conventional apparatus, the silicon substrate 10 on which the first electrode 25 is attached to the under surface of each of the diaphragms 14 formed in a matrix and the glass pedestal 13 on which the second electrodes 27 are provided in a matrix are closely bonded. Thus, the capacitor which is composed of the first electrodes 25 and the second electrodes 27 detects a pressure.

If there is the least error in positioning the silicon substrate 10 and the glass pedestal 13, the electrostatic capacitance between the electrodes 25 and 27 which are provided in each sensor 200 takes a different value from each other, so that it is impossible to measure the pressure distribution accurately.

(f) Since the electrostatic capacitance type semiconductor pressure sensor 200 is used in this apparatus, floating capacity sometimes causes measuring errors.

In order to reduce the level of any error due to floating capacity, it is necessary to enlarge the area of the first electrode 25 and the second electrode 27 of each sensor. The area per sensor is therefore increased and the resolution for detecting pressure distribution is inevitably lowered.

Electrostatic shielding may be provided in order to reduce the level of any error due to efloating capacity, but the entire structure of the apparatus will then become very complicated.

(g) Since an electrostatic type sensor 200 is used, an output signal changes only slightly in correspondence with a change in electrostatic capacitance. A means for positively detecting such a slightly changed output signal is required, which makes the entire apparatus complicated and expensive.

As described above, the conventional electrostatic capacitance type pressure distribution apparatus has the above-described problems (a) to (g), which are obstacles to enhancement of measuring accuracy and miniaturization of the apparatus. In addition, since the manufacturing method is complicated, mass production and, hence, reduction in cost are unrealizable.

At present, a pressure distribution detecting apparatus having highly-accurate two-dimensional resolution is required as, for example, a contact pressure sensor or tactile sensor for, for example, a precision work robot, or for other purposes. Therefore measures for overcoming these problems have been strongly demanded.

SUMMARY OF THE INVENTION

Accordingly, it is a primary object of the present invention to eliminate the above-described problems in the prior art and to provide a highly accurate semiconductor pressure sensor which facilitates miniaturization and mass production, and a method for the manufacturing the same.

It is a second object of the present invention to provide a pressure distribution apparatus which facilitates miniaturization and mass production and has high resolution. To achieve this aim, the present invention provides a semiconductor pressure sensor which is composed of
- a semiconductor substrate,
- an insulating diaphragm film which is made of an etching-resistant material and is provided on the main surface of the semiconductor substrate,
- at least one etching hole provided such as to penetrate through the diaphragm film and to reach the semiconductor substrate,
- a reference pressure chamber formed by etching through the etching hole to remove a part of the substrate;
- a sealing member for at least one etching hole, and
- at least one strain gage disposed at a predetermined position in a pressure receiving region of the diaphragm film, so that a pressure is detected on the basis of an output signal from the strain gage.

The above and other objects, features and advantages of the present invention will become clear from the following description of the preferred embodiments thereof, taken in conjunction with the accompanying drawings.

DESCRIPTION OF THE PREFERRED EMBODIMENTS

Preferred embodiments of the present invention will be explained with reference to the accompanying drawings.

First and second embodiments illustrate a semiconductor pressure sensor in accordance with the present invention and a manufacturing method thereof and a third embodiment illustrates a pressure distribution detecting apparatus using a semiconductor pressure sensor in accordance with the present invention.

First Embodiment

A semiconductor pressure sensor of the present invention comprises
a semiconductor pressure sensor which is composed of
a semiconductor substrate,
an insulating diaphragm film which is made of an etching-resistant material and is provided on the main surface of the semiconductor substrate,
at least one etching hole provided such as to penetrate through the diaphragm film and to reach the semiconductor substrate,
a reference pressure chamber formed by etching through the etching hole to remove a part of the substrate;
a sealing member for sealing at least one etching hole, and
at least one strain gage disposed at a predetermined position in a pressure receiving region of the diaphragm film, so that a pressure is detected on the basis of an output signal from the strain gage.

A semiconductor pressure sensor according to the first embdiment will be described hereinafter in more detail.

Figure 1:
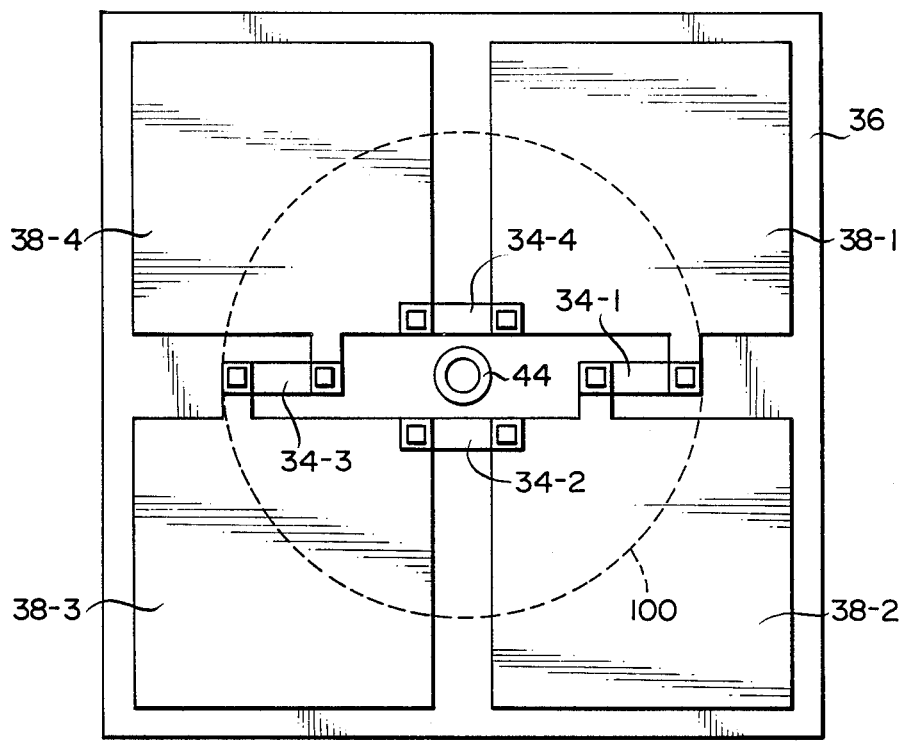
FIGS. 1 and 2 are explanatory views of an embodiment of a semiconductor pressure sensor and a manufacturing method therefor according to the present invention.
Figure 2:
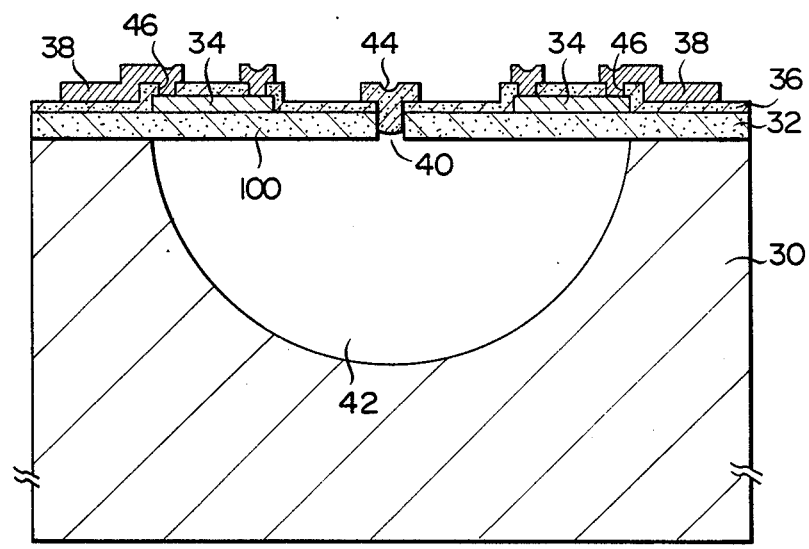

FIG. 1 is an explanatory plan view of the fundamental structure of a semiconductor pressure sensor according to the present invention, and FIG. 2 is an explanatory sectional view thereof.

A semiconductor pressure sensor of this embodiment is composed of a semiconductor substrate 30 the main surface of which is covered with an insulating diaphragm film 32 made of an etching-resistant material, and at least one strain gage 34 provided at a predetermined position in a pressure receiving region of the diaphragm 32.

The main surface of the substrate 30 which is provided with the diaphragm film 32 and the strain gage 34 is preferably further coated with an insulating protective film 36 having etching-resistance.

At least one etching hole 40 is formed at a predetermined position in the pressure receiving region such as to penetrate through the insulating protective film 36 and the diaphragm film 32 to reach the semiconductor substrate 30. A predetermined etchant is poured into the etching hole 40 and reaches the substrate 30 therethrough. Etching is thereby performed by utilizing the horizontal etching characteristic of the interface between the diaphragm film 32 and the semiconductor substrate 30, a reference pressure chamber 42 thus being formed by etching and removing a part of the semiconductor substrate 30. The entirety or a part of the etching hole 40 is sealed by a sealing member 44 as occasion demands.

If the insulating protective film 36 is formed on the surface of the strain gage 34, as described above, a connecting hole 46 is preferably provided on the insulating protective film 36 at both ends of the gage 34, and a plurality of electrodes 38 are provided so as to be connected to both ends of the strain gage 34 through the connecting holes 46.

An absolute pressure and a differential pressure are measured in the following manner using the semiconductor pressure sensor of the present invention having the above-described structure.

In the semiconductor pressure sensor in accordance with the present invention, the diaphragm film 32 situated above the reference pressure chamber 42 functions as a movable diaphragm 100, and if the insulating protective film 36 is provided as described above as well as the diaphragm 32, a lamination film consisting of the diaphragm film 32 and the insulating protective film 36 functions as the movable diaphragm 100.

When the pressure sensor of this embodiment is used as an absolute pressure measuring type sensor, all the etching holes 40 are sealed by the sealing member 44 while the reference pressure chamber 42 is maintained at a vacuum. When pressure is applied, the movable diaphragm 100 is deflected by an amount proportional to the absolute pressure applied, and the deflection changes the resistance of the strain gage 34 which is provided in the pressure receiving region.

For example, if a pair of strain 34 - 2, and 34 - 4 are disposed at the center of the pressure receiving region of the diaphragm film 32, and another pair of deflection gages 34 - 1 and 34 - 3 are disposed in the periphery of the pressure receiving region, then the strain applied to these gages reduce the resistance of the former pair of strain gages due to compression and increase that of the latter pair of strain gages due to tension.

If electrodes 38 - 1, 38 - 2, 38- 3 and 38 - 4 are bridged so that the changes in resistances of these pairs of strain gages are added, and a power source is connected to the opposing pair of electrodes, the other pair of electrodes output a voltage which is proportional to the absolute pressure applied to the movable diaphragm 100.

Thus, the semiconductor pressure sensor in accordance with the present invention enables an absolute pressure to be measured accurately.

When the semiconductor pressure sensor of this embodiment is used as a differential pressure measuring type sensor, a plurality of etching holes 40 are provided, some of them being sealed by the sealing member 44, and the others being open. Pressure introducing means for introducing pressure for comparison to the reference pressure chamber 42 are provided at the open etching holes 40.

Thus, differences in the pressure applied to the top side and the back side of the movable diaphragm 100 are accurately measured as a change in the resistance of the strain gage 34 in the same way as in the absolute pressure measuring type sensor.

Manufacturing Method

A method of fabricating the semiconductor pressure sensor in accordance with this embodiment will be explained hereinafter.

The method according to this embodiment is composed of the steps of
forming an insulating diaphragm film of an etching-resistant material on the main surface of a semiconductor substrate,
forming at least one strain gage at a predetermined position of a pressure receiving region of the diaphragm film,
forming an insulating protective film of an etching-resistant material on the strain gage;
forming at least one etching hole at a predetermined position of the pressure receiving region such as to penetrate through the insulating protective film and the diaphragm film and reach the semiconductor substrate,
forming a movable diaphragm and a reference pressure chamber of a predetermined configuration by etching and removing a part of the semiconductor substrate on pouring an etchant into the etching hole, sealing at least one etching hole by a sealing member, forming a plurality of connecting holes on the insulating protective film at both ends of the strain gage, and forming a plurality of electrodes which are connected to the strain gage through the connecting holes.

All the processing steps are conducted solely on the main surface of the semiconductor substrate which is provided with the strain gage.

The manufacturing method will be explained more concretely in the following.

The insulating diaphragm film 32 of an etching-resistant material is first formed on the main surface of the semiconductor substrate 30, and at least one diaphragm strain gage is provided on the diaphragm film 32 at a predetermined position in the pressure receiving region.

The insulating protective film 36 is formed on the diaphragm film 32 and the strain gage 34.

At least one etching hole 40 is next formed at a predetermined position in the pressure receiving region such as to penetrate the insulating protective film 36 and the diaphragm 32 to reach the semiconductor substrate 30.

When a predetermined etchant is poured onto the substrate 30 through the etching hole 40, etching proceeds utilizing the etching characteristic in the horizontal direction of the interface between the diaphragm film 32 and the substrate 30 to remove a part of the substrate 30, thereby forming the reference pressure chamber 42.

Since the diaphragm film 32 situated above the reference pressure chamber 42 is formed of an etching-resistant material, it is only slightly etched. As a result, a laminated film consisting of the diaphragm film 32 and the insulating protective film 36 functions as the movable diaphragm 100 with respect to the reference pressure chamber 42.

According to this embodiment, since the thickness of the diaphragm 100 takes a value equivalent to the sum of the thickness of the diaphragm film 32 and the insulating protective film 36, it is possible to form the diaphragm with a predetermined thickness such that it may process a thin and precisely dimensioned thickness utilizing the known thin film-forming technique.

Furthermore, it is possible to form the diaphragm 100 with high accuracy without being influenced by the non-uniform thickness of the semiconductor substrates as in the prior art. Therefore, it is possible to make the thickness and the size of the diaphragm 100 adequately small and highly accurate in accordance with a predetermined dimension.

According to the present invention, after the reference pressure chamber 42 is formed, at least one of the etching holes 40 provided for forming the reference pressure chamber 42 is sealed by the sealing member 44.

If the sensor of the present invention is formed as an absolute pressure measuring sensor, all the etching holes 40 are sealed by the sealing member 44 while the reference pressure chambers 42 are maintained in a vacuum state.

If the sensor of the present invention is formed as a differential pressure measuring sensor, a plurality of etching holes 40 are provided, as described above, and some of them are sealed by the sealing member 44, the others being left open. Pressure introducing means for introducing a second pressure to the reference pressure chamber 42 through the open etching holes 40 are provided. Thus, differences in the pressure applied to the top side and the back side of the movable diaphragm 100 are measured as a change in the resistance of the strain gage 34.

Since the surface of the strain gage 34 is covered with the insulating protective film 36 in the present invention, it is necessary to provide electrodes for fetching a signal from the strain gage 34. For this purpose, a plurality of connecting holes 46 are provided on the insulating protective film at both ends of the strain gage 34, and a plurality of electrodes 38 are provided which are connected to the strain gage 34 through the connecting holes 46. Thus, a change in resistance of the strain gage 34 is detected through the electrodes 38.

Comparison with the Prior Art

The semiconductor pressure sensor of the present invention and the manufacturing method thereof have the above-described structure. The characteristics thereof will be concretely explained in the following in comparison with the prior art.

(a) The present invention enables the sensor to be fabricated by what is called single-sided processing, in other words, all the processing steps are conducted solely on the main surface of the semiconductor substrate 30.

That is, according to the present invention, the diaphragm 100 is formed on the main surface of the substrate 30 using the known thin film forming technique, the reference pressure chamber 42 is formed by pouring an etchant into the etching hole 40 provided on the main surface of the substrate 30, and the reference pressure chamber 42 is sealed by applying an integrated circuit fabricating technique such as vacuum evaporation. In this way, it is possible to conduct all the wafer processing steps solely on the main surface side of the substrate 30, and to fabricate the sensor by what is called single-sided processing.

As a result, according to the present invention, the manufacturing method is simplified in comparison with a conventional sensor processed on both sides, which leads to a reduction in costs.

(b) It is possible to form the diaphragm with a predetermined thickness such that it may process a thin and precisely dimensioned thickness utilizing the known thin film-forming technique.

Furthermore, it is possible to form the diaphragm 100 with high accuracy without being influenced by the non-uniform thickness of the semiconductor substrates as in the prior art. Therefore, it is possible to make the thickness and the size of the diaphragm 100 adequately small and highly accurate in accordance with a predetermined plane dimension.

Thus, according to the present invention, it is possible to form a diaphragm to a predetermined reduced thickness and dimension with high accuracy, and it is possible to obtain a small-sized and highly sensitive sensor.

(c) Since the reference pressure chamber 42 is formed between the diaphragm film 32 and the substrate 30, when an absolute pressure measuring type sensor is formed, airtight sealing of the reference pressure chamber 42 is easily and securely conducted by an integrated circuit fabricating technique such as vacuum evaporation. As a result, airtight bonding between the substrate 30 and the pedestal which has previously been an obstacle to mass production is obviated, and it is possible to simplify the fabrication of the sensor to a great extent.

(d) Since the strain gage 34 provided on the diaphragm film 32 is coated by the insulating protective film 36, when a plurality of strain gages are provided, each strain gage 34 is isolated from the others, thereby preventing leakage current due to a rise in temperature as in the case of P - N junction isolation, and enabling the sensor to be operated stably up to a high-temperature range.

(e) The present invention enables the semiconductor pressure sensor itself to be formed in an integrated manner.

That is, since it is possible to conduct all the processing steps by one-sided processing, as described above, and to make the diaphragm 100 very thin and small, it is easy to design and treat the semiconductor pressure sensor itself as one element which constitutes an integrated circuit and, in addition, since it is possible to make the sensor itself using substantially the same technique as the integrated circuit fabricating technique, it is possible to fabricate the pressure sensor in an integrated manner on the same substrate as a predetermined signal processing circuit such as an amplifier.

From the experiments undertaken it has been confirmed that it is possible to make the dimension of a diaphragm of the present invention substantially less than 1/10 that of a diaphragm of a conventional semiconductor pressure sensor.

From the foregoing it will be understood that, since it is possible to form a thin and small diaphragm, the present invention makes it possible to provide a small-sized and highly accurate semiconductor pressure sensor, and that since it is possible to fabricate the sensor by what is called a single-sided processing, mass production is made very easy and it is possible to produce a sensor at low cost.

EXAMPLES

Examples of the first embodiment will be explained hereinafter.

(a) First Example

A first example will be explained with reference to FIGS. 1 and 2.

In this semiconductor pressure sensor, the semiconductor substrate 30 is formed of a silicon substrate, and the entire main surface of the silicon substrate 30 is covered with a 400 nm-thick silicon nitride ($Si_3N_4$) film as the diaphragm film 32 by low pressure CVD.

The strain gages 34 - 1, 34 - 2, 34 - 3 and 34 - 4 are provided on the surface of the diaphragm film 32. The strain gages in this example are provided by forming a polysilicon film on the surface of the silicon nitride which constitutes the diaphragm film 32 to a thickness of 100 nm by low pressure CVD, adding boron to the polysilicon as impurities by thermal diffusion or ion implantation and diffusing it thereinto so as to form a P-type semiconductor, and thereafter removing unnecessary portions by photoetching.

The entire surface including the strain gages 34 formed in this way is covered with silicon nitride as the 100 nm-thick insulating protective film 36 by low pressure CVD.

A 2 $\mu$m-diameter etching hole 40 is provided at a predetermined position of the pressure receiving region such as to penetrate the insulating protective film 36 and the diaphragm film 32 and reach the silicon substrate 30, and a predetermined etchant is poured onto the substrate 30 through the etching hole 40.

In this example, a mixed aqueous solution of nitric acid ($HNO_3$) and hydrofluoric acid (HF) is used as the etchant, and when the etchant is poured into the etching hole 40, etching proceeds with the etching hole 40 as its center.

As the etching proceeds in the vertical direction of the silicon substrate 30, it also proceeded in the horizontal direction of the interface between the silicon substrate 30 and the diaphragm film 32, thereby forming a cavity which is to constitute the reference pressure chamber 42.

Since the diaphragm film 32 and the insulating protective film 36 situated above the reference pressure chamber 42 are made of an etching-resistant material, they are only slightly etched, and the laminated film consisting of the diaphragm film 32 and the insulating protective film 36 functions as the movable diaphragm 100 with respect to the reference pressure chamber 42.

Since each of the strain gages 34 is coated with and sandwiched between the diaphragm film 32 and the insulating protective film 36, it is not influenced at all by the etchant.

After the reference pressure chamber 42 is formed in this manner, the sealing member 44 is formed by depositing a metal or insulating material onto the insulating protective film 36 to such a thickness as to seal the etching hole 40 by vacuum evaporation or sputtering, and then removing an unnecessary portion by photoetching.

Thus, the reference pressure chamber 42 is sealed while the pressure of the interior is maintained at a vacuum.

The portions of the insulating protective film 36 at both ends of the strain gage 34 are removed by photoetching so as to form the connecting holes 46. The connecting holes 46 are covered with an aluminum evaporation film and photoetched into an appropriate configuration so as to form the electrodes 38.

The semiconductor pressure sensor of this example having the above-described structure detects the absolute pressure applied from the upper side of the semiconductor pressure sensor 100 as a change in the resistance of the strain gage 34 and produces a signal which is proportional to the absolute pressure through the electrodes 38.

It has been confirmed from the experiments on this example that it is possible to make the diameter of the diaphragm 100 as small as 50 $\mu$m and the thickness as thin as 0.5 $\mu$m, and to obtain an excellent output sensitivity of more than 2 mV/V with respect to a pressure of 100 KPa. It is therefore understood that according to the first embodiment it is possible to make the thickness and the dimension of the diaphragm film adequately small and realize a small-sized sensor displaying high sensitivity.

(b) Second Example

A second example will here be described. The diaphragm of this sensor is formed into a rectangular shape. The same reference numerals are provided for those elements which are the same as those in the first example, and explanation thereof will be omitted.

Figure 3:
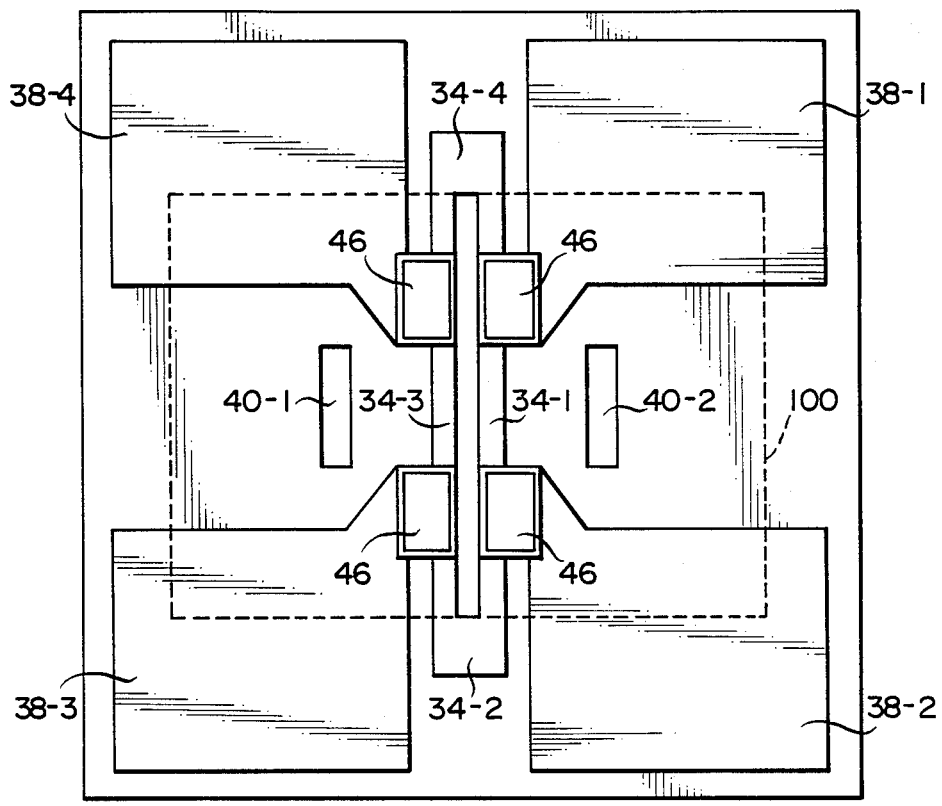
FIGS. 3 and 4 are schematic explanatory views of another embodiment of the present invention.
Figure 4:
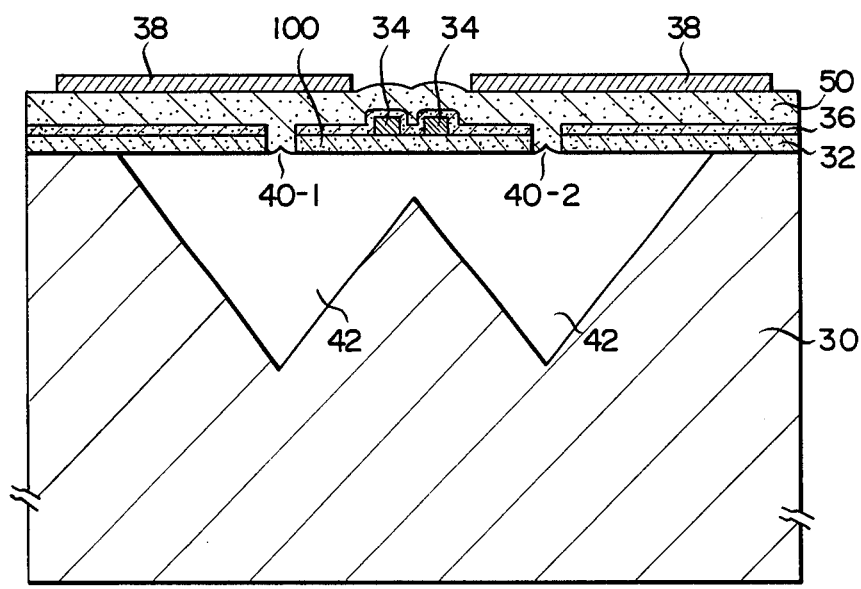

FIG. 3 is an explanatory plan view of the second example of the sensors of the first embodiment, and FIG. 4 is an explanatory sectional view thereof.

In this sensor, the semiconductor substrate 30 is made of a silicon substrate with the plane (100) as the main surface. On the main surface of the substrate 30 are provided the diaphragm film 32 of silicon nitride, the strain gages 34 - 1, 34 - 2, 34 - 3, 34 - 4, and the insulating protective film 36 of silicon nitride, in the same way as in the first example.

The feature of this example is constituted by that the diaphragm 100 is formed into a rectangular shape, and for this purpose, a first etching hole 40 - 1, and a second etching hole 40 - 2 which have a rectangular shape 2 μm in width are formed approximately parallel to each other on the laminated film consisting of the insulating protective film 36 and the diaphragm film 32.

Into the first and second etching holes 40 an etchant of potassium hydroxide (KOH) water solution is poured for anisotropic etching.

At this time etching in the horizontal direction of the interface between the silicon substrate 30 and the diaphragm film 32 proceeds in the same way as in the case of the first example, so that the reference pressure chambers 42 having a triangular section are formed with the respective etching holes 40 - 1, 40 - 2 as their centers, as shown in FIG. 4.

As a result, the movable diaphragm 100 which is situated above the reference pressure chamber 42 and has a rectangular shape having its sides in the direction of (110) is formed. The strain gages 34 - 1, 34 - 2, . . . 34 - 4 in this example are disposed in the central portion of the diaphragm 100 in parallel to the shorter sides of the rectangular.

In this example, the entire surface of the insulating protective film 36 is coated with silicon oxide ($SiO_2$) as a second insulating protective film 50 by low pressure CVD or plasma CVD, the second insulating protective film 50 functioning as the sealing member 44 for sealing the first and second etching holes 40.

The connecting holes 46 are provided by photoetching which penetrate the insulating protective films 36 and 50 and reach both ends of each of the strain gages 34 - 1, 34 - 2 . . . 34 - 4. The electrodes 38 which are connected to both ends of each of the strain gages 34 - 1, 34 - 2, . . . 34 - 4 through the connecting holes 46 are formed.

As described above, the second example is very preferable when the rectangular diaphragm 100 is formed.

(c) Third Example

A third example of the first embodiment will be explained in the following. The sensor of this example is a differential pressure measuring type sensor. The same reference numerals are provided for those elements which are the same as those in the first example, and explanation thereof will be omitted.

Figure 5:
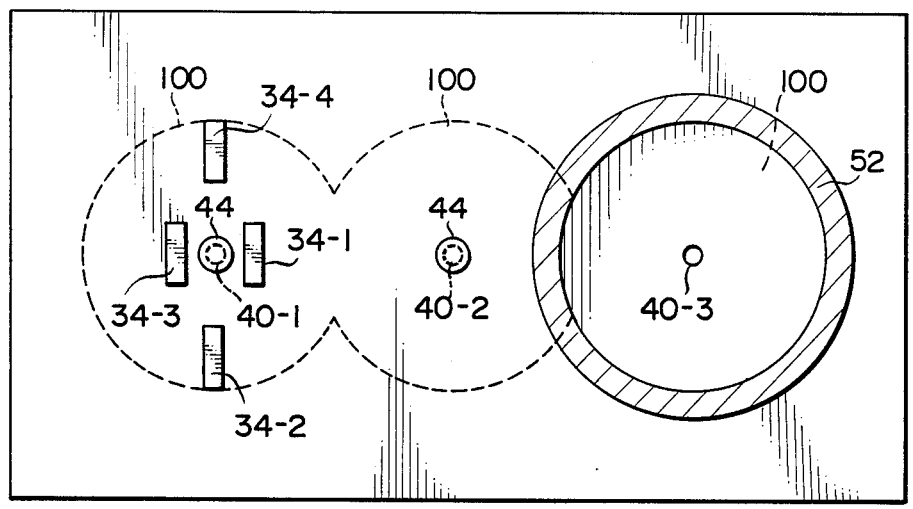
FIGS. 5 and 6 are schematic explanatory views of still another embodiment of the present invention.
Figure 6:
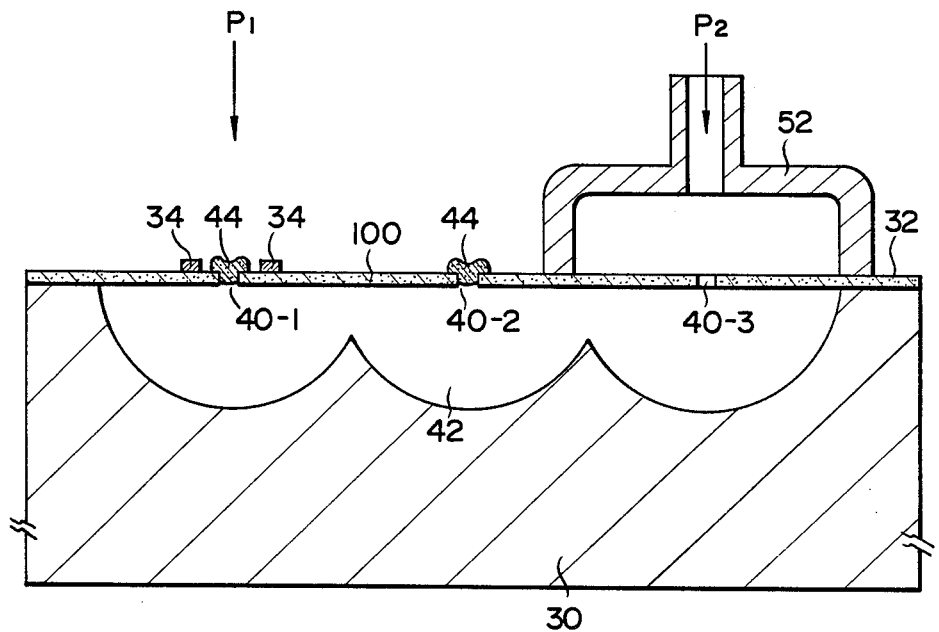

FIG. 5 is a plan view of the third example of the sensor, and FIG. 6 is a schematic explanatory sectional view thereof.

In this sensor, the diaphragm film 32 of silicon nitride is formed on the surface of the semiconductor substrate 30 in the same way as in the first example, and the strain gages 34 - 1, 34 - 2, 34 - 3 are made on the diaphragm film 32.

Three etching holes 40 - 1, 40 - 2 and 40 - 3 are formed at predetermined positions of the pressure receiving region of the diaphragm film 32. Isotropic etching is conducted through the etching holes 40 in the same way as in the first example, thereby forming the reference pressure chamber 42 which is composed of three semicircular cavities communicating with each other.

After the reference pressure chamber 42 is formed, the etching holes 40 are sealed by the sealing members 44.

This example is characterized in that only two etohing holes 40 - 1 and 40 - 2 are sealed and the other hole 40 - 3 is left open.

A pressure introducing cap 52 which communicates with the open etching hole 40 - 3 is provided on the outer periphery of the movable diaphragm 100, so that a second pressure is applied to the reference pressure chamber 42 through the pressure introducing cap 52.

Thus, a first pressure $P_1$ and a second pressure $P_2$ are applied to the top side and the back side, respectively, of the movable diaphragm 100, and a deflection which is proportional to the differential pressure is produced on the movable diaphragm 100. As a result, the semiconductor pressure sensor of this example can accurately detect the differential pressure of the first and second pressures as a change in the resistance of the strain gage 34.

Though the insulating protective film 36, the connecting holes 46 and the electrodes 38 are omitted in FIGS. 5 and 6 for the purpose of a better understanding, these elements are provided in the same way as in the first and second examples.

(d) Fourth Example

A fourth example of the first embodiment will now be explained. This example is characterized in that the semiconductor pressure sensor is integrally provided with an integrated circuit in order to use it as what is called an integrated semiconductor pressure sensor.

Figure 7:
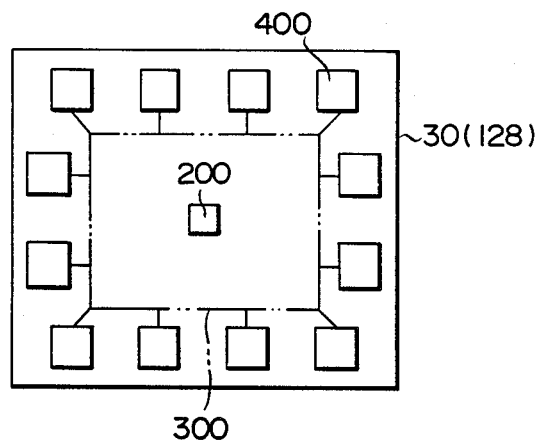
FIG. 7 is an explanatory view of a further embodiment of the present invention.
Figure 8:
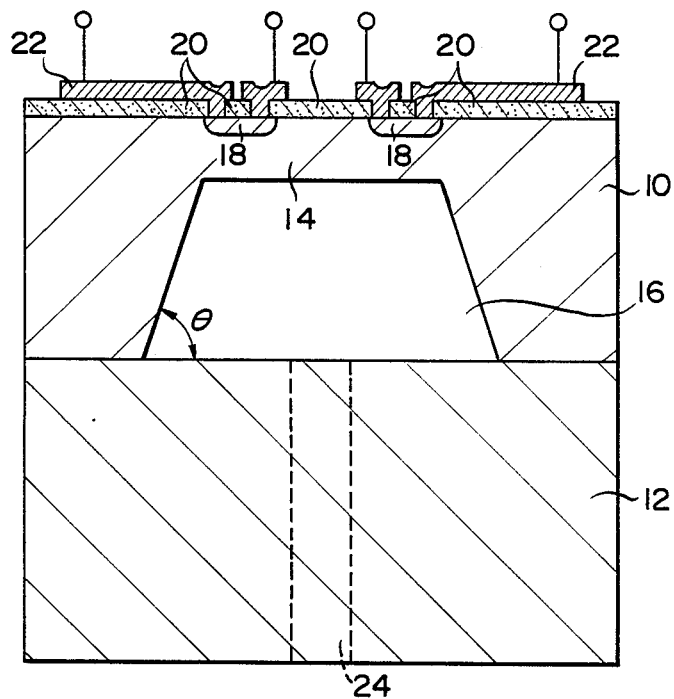
FIG. 8 is a schematic explanatory view of a conventional semiconductor pressure sensor and a manufacturing method therefor.

FIG. 7 is an external view of the fourth example of the semiconductor pressure sensors. A semiconductor pressure sensor 200 of the present invention which has been explained in the first and second examples is formed at a predetermined position of the silicon substrate 30. On the silicon substrate 30 are provided an integrated circuit 300 for amplifying the output of the pressure sensor 200 and processing a signal, a lead for connecting the sensor 200 with the integrated circuit 300, and a plurality of electrodes 400 for externally connecting them.

Thus, in this example, it is possible to make the semiconductor pressure sensor so small as to be regarded as one component of the integrated circuit and, in addition, it is fabricated by a single-sided processing using the same processing steps as those for the integrated circuit.

It will therefore be understood that the fourth example is preferable in the case of fabricating a semiconductor pressure sensor integrally with an integrated circuit as what is called an integrated sensor.

(e) Other Examples

Although the case of using the laminated film of the diaphragm film 32 and the insulating protective film 36 as the movable diaphragm 100 and the case of using the multi-layered film of the above-described laminated film with the second insulating protective film 50 of a predetermined oxide film added thereto as the movable diaphragm 100 are illustrated in the aforementioned examples, the first embodiment is not limited thereto. For example, it is possible to form the movable diaphragm 100 by depositing polysilicon on a silicon nitride film, which is preferable in the case in which the thick diaphragm 100 is required.

Although silicon nitride is used as the diaphragm film 32 and the insulating protective film 36 in these examples, other insulating materials which can be deposited stably onto the silicon substrate 30 and the etching speed of which is much slower than that of silicon may be used, e.g., alumina ($Al_2O_3$), sapphire ($Al_2O_3$), or calcium fluoride ($CaF_2$).

In these examples, polysilicon is used for the strain gage 34, and it is possible to recrystallize polysilicon to single-crystal silicon in order to further improve the sensitivity. Other materials which can be deposited stably onto the diaphragm film and exhibit sufficient piezoresistive effects may be used as a material for the strain gage 34.

As described above, the semiconductor pressure sensor of the present invention which can be made small in size and high in accuracy will be widely used as a pressure sensor for barometers and tonometers, a pressure sensor for controlling automobile engines, and a pressure sensor in industrial (plant) pressure transmitters and for other purposes.

Second Embodiment

A semiconductor pressure sensor of the second embodiment is composed of
  a semiconductor substrate,
  a disappearing film for coating the main surface of the semiconductor substrate and having an isotropic etching characteristic,
  an insulating diaphragm film which is made of an etching-resistant material and is provided on the main surface of the semiconductor substrate in such a manner as to coat the disappearing film,
  at least one etching hole provided such as to penetrate through the diaphragm film and to reach the disappearing film;
  a reference pressure chamber formed by etching through the etching hole to remove a part of the substrate and the disappearing film; and
  at least one strain gage disposed at a predetermined position in a pressure receiving region of the diaphragm film, so that a pressure is detected on the basis of an output signal from the strain gage.

The semiconductor pressure sensor of this example will be described in more detail hereinunder.

Figure 9:
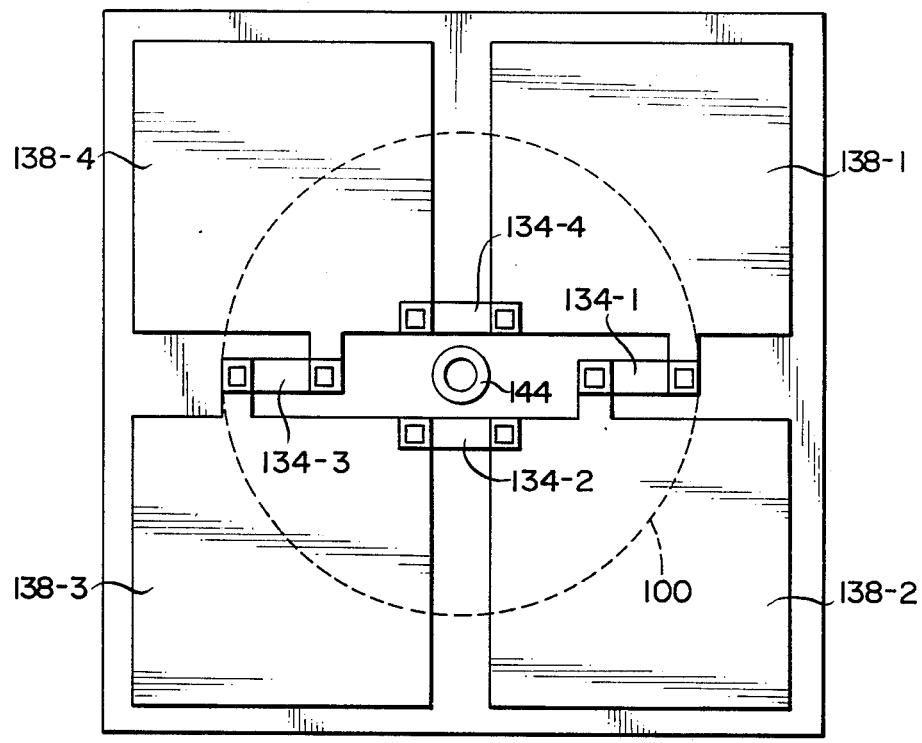
FIGS. 9 and 10 are schematic explanatory views of a still further embodiment of a semiconductor pressure sensor and a manufacturing method therefor according to the present invention the present invention.
Figure 10:
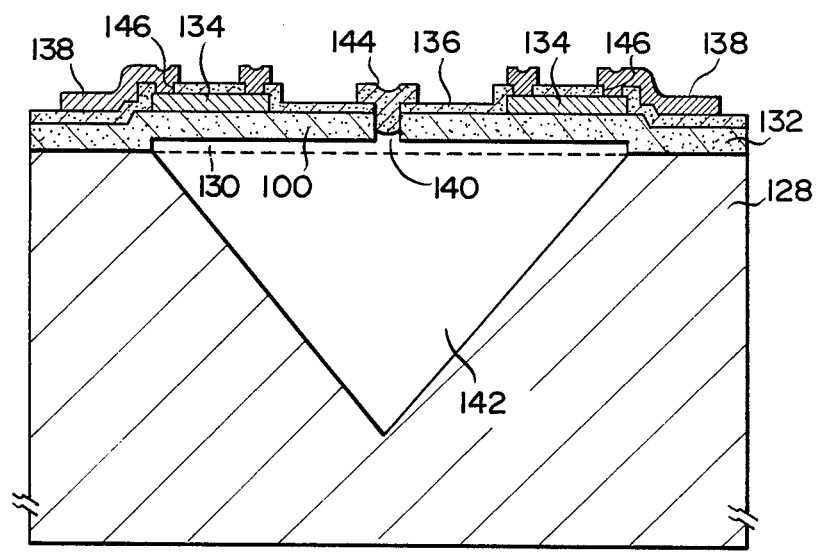

FIG. 9 is an explanatory plan view of the fundamental structure of a semiconductor pressure sensor according to this embodiment, and FIG. 10 is an explanatory sectional view thereof.

A semiconductor pressure sensor of this embodiment is composed of a semiconductor substrate 128, a disappearing film 130 which is provided in the pressure receiving region of the main surface of the substrate 128 and has a predetermined plane configuration and an isotropic etching characteristic.

The main surface of the semiconductor substrate 128 is covered with an insulating diaphragm film 132 made of an etching-resistant material in such a manner as to cover the entire surface of the disappearing film 130, and at least one strain gage 34 is provided at a predetermined position in the pressure receiving region of the diaphragm 132.

It is preferable to coat the diaphragm film 132 and the strain gage 134 with an insulating protective film 136 consisting of an etching-resistant material.

At least one etching hole 140 is formed at a predetermined position in the pressure receiving region such as to penetrate through the insulating protective film 136 and the diaphragm film 132 and to reach the disappearing film 130. A part of the substrate 128 and the entirety of the disappearing film 130 are etched and removed through the etching hole 140, thereby forming a reference pressure chamber 142.

The entirety or a part of the etching hole 140 is sealed by a sealing member 144 as occasion demands.

If the insulating protective film 136 is formed on the surface of the strain gage 134, as described above, a connecting hole 146 is preferably provided on the insulating protective film 136 at both ends of the gage 134, and a plurality of electrodes 138 are provided so as to be connected to both ends of the strain gage 134 through the connecting holes 146.

An absolute pressure and a differential pressure are measured in the following manner using the semiconductor pressure sensor of this embodiment having the above-described structure.

In the semiconductor pressure sensor in accordance with this embodiment, the diaphragm film 132 situated above the reference pressure chamber 142 functions as the movable diaphragm 100, and if the insulating protective film 136 is provided as described above as well as the diaphragm 132, a laminated film consisting of the diaphragm film 132 and the insulating protective film 136 functions as the movable diaphragm 100.

When the pressure sensor of the present invention is used as an absolute pressure measuring type sensor, all the etching holes 140 are sealed by the sealing member 144 while the reference pressure chamber 142 is maintained in a vacuum state. When a pressure is applied, the movable diaphragm 100 is deflected by the amount proportional to the absolute pressure applied, and the deflection changes the resistance of the strain gage 134 which is provided in the pressure receiving region.

For example, if a pair of strain gages 134 - 2, and 134 - 4 are disposed at the center of the pressure receiving region of the diaphragm film 132, and another pair of strain gages 134 - 1 and 134 - 3 are disposed in the periphery of the pressure receiving region, then the strains applied to these strain gages reduce the resistance of the former pair of strain gages due to compression and increase that of the latter pair of strain gages due to tension.

If electrodes 138 - 1, 138 - 2, 138- 3 and 138 - 4 are bridged so that the changes in the resistances of these pairs of strain gages are added, and power source is connected to the opposing pair of electrodes, the other pair of electrodes output a voltage which is proportional to the absolute pressure applied to the movable diaphragm 100.

Thus, the semiconductor pressure sensor in accordance with the present invention enables an absolute pressure to be measured accurately.

Figure 11:
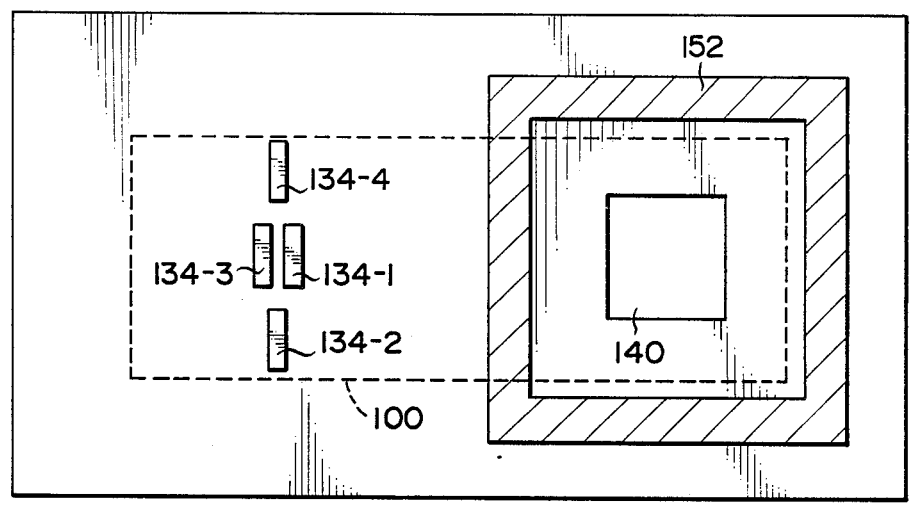
FIGS. 11 and 12 are schematic explanatory views of a still further embodiment of the present invention.
Figure 12:
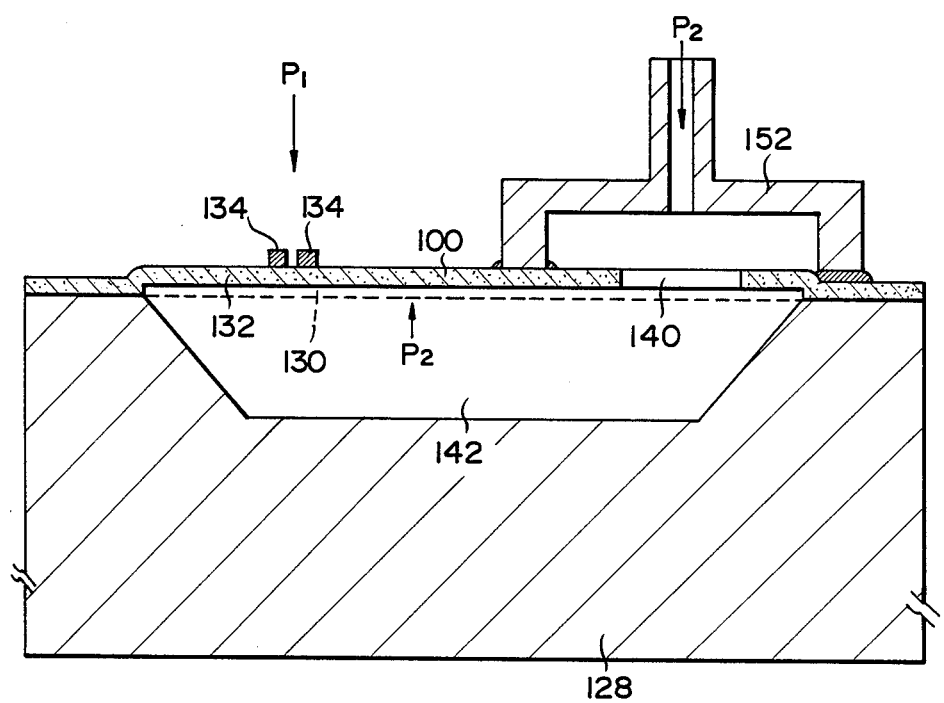

When the semiconductor pressure sensor of the present invention is used as a differential pressure measuring type sensor, for example, the movable diaphragm 100 is formed into a rectangular configuration and the movable diaphragm 100 is longitudinally divided into two portions, as shown in FIGS. 11 and 12. At least one strain gage 134 is disposed at one region and the etching hole 140 is disposed at the other region. A means for introducing a pressure to be compared to the etching hole 140 is provided.

Alternatively, a plurality of etching holes 140 are provided, some of them being sealed by the sealing members 144, and the others being left open. Pressure introducing means for introducing a pressure for comparison to the reference pressure chamber 142 are provided at the open etching holes 140.

Thus, the difference in pressures applied to the top side and the back side of the movable diaphragm 100 is accurately measured as a change in the resistance of the strain gage 134 in the same was as in the absolute pressure measuring type sensor.

Manufacturing Method

A method of fabricating the semiconductor pressure sensor in accordance with this embodiment will be explained hereinafter.

The method according to this embodiment is composed of the steps of forming a disappearing film having an isotropic etching characteristic in the pressure receiving region of the main surface of a semiconductor substrate, forming an insulating diaphragm film of an etching-resistant material on the main surface of the semiconductor substrate in such a manner as to coat the disappearing film, forming at least one strain gage at a predetermined position of a pressure receiving region of the diaphragm film, forming an insulating protective film of an etching-resistant material on the diaphragm film such as to cover the strain gage;

forming at least one etching hole at a predetermined position of the pressure receiving region such as to penetrate through the insulating protective film and the diaphragm film and reach the disappearing film, forming a reference pressure chamber of a predetermined configuration and a movable diaphragm covering the reference pressure chamber by etching and removing a part of the semiconductor substrate and the entirety of the disappearing film on pouring an anisotropic etchant into the etching hole, sealing at least one etching hole by a sealing member as occasion demands, forming connecting holes on the insulating protective film at both ends of the strain gage, and forming electrodes which are connected to the strain gage through the connecting holes.

All the processing steps are conducted solely on the main surface of the semiconductor substrate which is provided with the strain gage.

The manufacturing method will be explained more concretely in the following.

The pressure receiving region of the main surface of the semiconductor substrate 128 is first coated with the disappearing film 130 having an isotropic etching characteristic.

In this step, it is preferable that the entire main surface of the semiconductor substrate 128 is first coated with the disappearing film 130 having an isotropic etching characteristic and an unnecessary portion is next removed except the pressure receiving region.

Alternatively, the main surface is first coated with an etching-resistant insulating film, an opening is next formed in the pressure receiving region, and the opening portion is finally covered with the disappearing film 130.

After the disappearing film 130 is formed in this manner, the insulating diaphragm film 132 of an etching-resistant material is formed on the disappearing film 30 and the main surface of the semiconductor substrate 128, and at least one diaphragm 134 is provided on the diaphragm film 132 at a predetermined position in the pressure receiving region. The insulating protective film 136 is further formed on the strain gage 134 and the diaphragm film 132.

After the disappearing film 130, the diaphragm film 132 and the insulating protective film 136 are formed, at least one etching hole 140 is next formed at a predetermined position of the pressure receiving region such as to penetrate the insulating protective film 136 and the diaphragm 132 to reach the disappearing film 130.

The feature of this embodiment is that a part of the semiconductor substrate 128 and the entirety of the disappearing film 130 are etched and removed on pouring an anisotropic etchant into the etching hole 140 formed in this way, thereby forming the reference pressure chamber 142 and the movable diaphragm 100 which covers it. This step will be described in detail in the following.

Figure 17:
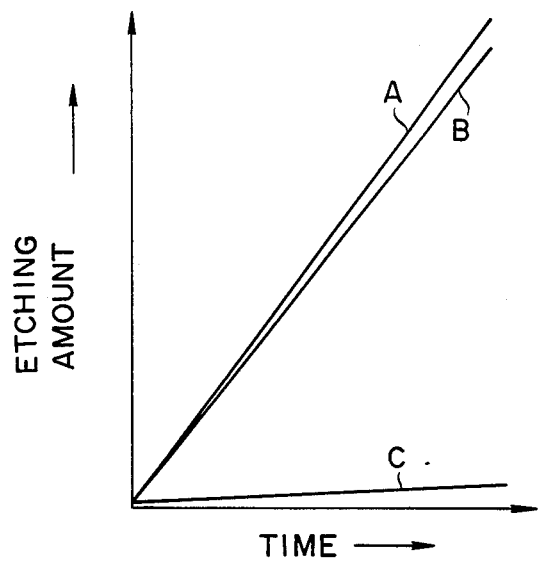
FIG. 17 is a characteristic diagram showing the etching characteristic of each part of a semiconductor sensor in accordance with the present invention.

FIG. 17 shows the etching characteristics of the respective parts, wherein the characteristic curve A represents the etching characteristic in the horizontal direction of the polysilicon film which is used as the disappearing film 130, B the etching characteristic in the vertical direction of the single-crystal silicon film which is used as the semiconductor substrate 128, and C the etching characteristic of the interface between the diaphragm film 132 of silicon nitride and the single-crystal silicon substrate 128.

Figure 18:
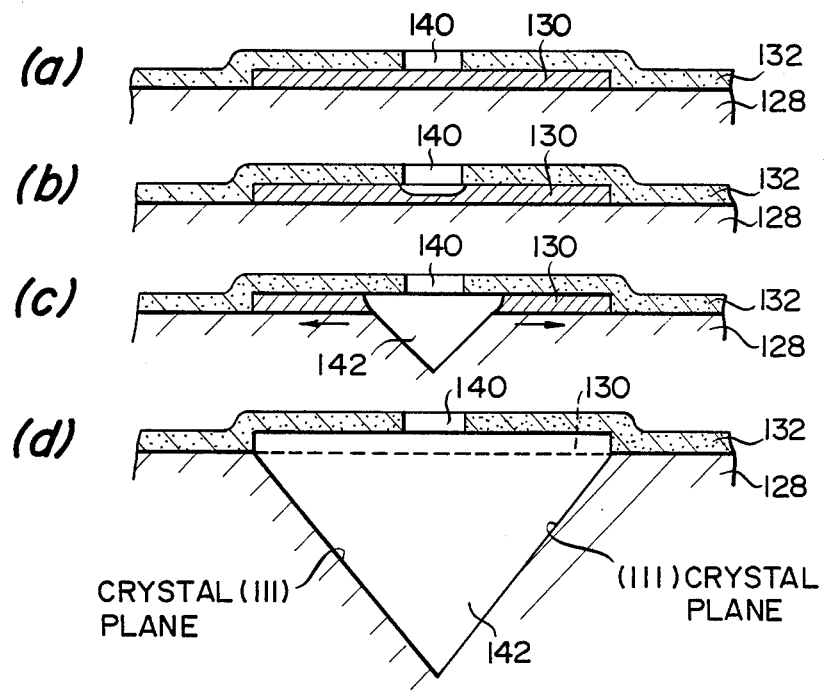
FIG. 18 is an explanatory view of the step of forming a reference pressure chamber in a method of manufacturing a semiconductor pressure sensor according to the present invention.

FIG. 18 shows the state in which etching proceeds when an anisotropic etchant is poured into the etching hole 140, wherein (a) shows a state before anisotropic etching, (b) a state at the initial stage of etching, (c) a state in the middle of etching, and (d) a state at the completion of etching.

When an anisotropic liquid is poured into the etching hole 140, isotropic etching proceeds on the disappearing film 130 from the state (a) to the state (c) through the state (b). The disappearing film 130 begins to disappear first from the central part and the opening portion is gradually enlarged. The area of the opening portion is increased in the horizontal direction with time in accordance with the characteristic curve A in FIG. 17.

In the single-crystal silicon substrate 128 which is exposed by the disappearance of the disappearing film 130, anisotropic etching proceeds with the increase in the opening area of the disappearing film 130, and etching vertically proceeds in accordance with the characteristic curve B in FIG. 17.

If the opening area of the disappearing film 130 were constant, the etching of the single-crystal substrate 128 would stop at the depth at which the plane (111) crosses the right and left inclined surfaces. In this embodiment, however, since the opening area continuously increases with time, vertical etching of the single-crystal silicon substrate 128 proceeds, as shown in FIG. 18 (c).

When all the disappearing film 130 is etched to be removed, the etching characteristic in the horizontal direction changes from the characteristic indicated by the characteristic curve A of the disappearing film 130 in FIG. 17 to that indicated by the characteristic curve C of the interface between the single-crystal silicon substrate 128 and the diaphragm film 132, as shown in FIG. 18 (d), and the etching speed in the horizontal direction is lowered to approximately several % of the initial etching speed.

As a result, when the etching attains the state shown in FIG. 18(d), the opening area in the horizontal direction is only slightly enlarged, and the etching of the single-crystal silicon substrate 128 substantially stops at the depth at which the inclined surfaces cross as the plane (111).

In other words, according to this embodiment, the patterned dimension of the semiconductor substrate 128 is determined by the configuration of the disappearing film 130 and even if etching is continued further, the configuration changes very little.

Thus, this embodiment enables the reference pressure chamber 142 of the size which is correspondent to that of the disappearing film 130 to be formed between the substrate 128 and the diaphragm film 132.

Since the diaphragm film 132 situated above the reference pressure chamber 142 is formed of an etching-resistant material, it is only slightly etched. As a result, a laminated film consisting of the diaphragm film 132 and the insulating protective film 136 functions as the movable diaphragm 100 with respect to the reference pressure chamber 142.

The configuration of this movable diaphragm 100 is approximately in conformity with the configuration of the disappearing film 130. Therefore, it is possible to form the diaphragm which is sufficiently small and has a desired shape with high accuracy by presetting the configuration of the disappearing film 130 without being influenced by the non-uniform thickness of the semiconductors 128 as in the prior art.

According to this embodiment, since the thickness of the diaphragm 100 takes a value equivalent to the sum of the thickness of the diaphragm film 132 and the insulating protective film 136, it is possible to form the diaphragm 100 with a desired thickness such that it may possess a thin and precisely dimensional thickness utilizing the known thin film forming technique.

As described above, according to this embodiment, it is possible to make the dimension and the size of the diaphragm sufficiently small with high accuracy in accordance with a predetermined configuration and value, thereby obtaining a small and highly accurate pressure sensor.

According to this embodiment, after the reference pressure chamber 142 and the movable diaphragm 100 are formed, the etching hole 140 is sealed by the sealing members 144, if necessary.

If the sensor of this embodiment is formed as an absolute pressure measuring sensor, all the etching holes 140 are sealed by the sealing members 140 while the reference pressure chambers 142 are maintained in a vacuum state.

On the other hand, if the sensor of the present invention is formed as a differential pressure measuring sensor, a means for introducing a second pressure to the reference pressure chamber 142 is provided at the etching hole 140.

Thus, difference between the the first pressure applied to the top side of the diaphragm 100 and the second pressure applied to the back side thereof is accurately measured as a change in the resistance of the strain gage 34 in the same way as in the absolute pressure measuring type sensor.

Since the surface of the strain gage 134 is covered with the insulating protective film 136 in this embodiment, it is necessary to provide electrodes for fetching a signal from the diaphragm 134. For this purpose, a plurality of connecting holes 146 are provided on the insulating protective film 136 at both ends of the diaphragm 134, and a plurality of electrodes 138 are provided which are connected to the strain gage 134 through the connecting holes 146. Thus, a change in the resistance of the strain gage 134 is detected through the electrodes 138.

Comparison with the Prior Art

The semiconductor pressure sensor of this embodiment and the manufacturing method thereof have the above-described structure. The characteristics thereof will be concretely explained in the following in comparison with the prior art.

(a) The present invention enables the sensor to be fabricated by what is called a single-sided processing, in other words, all the processing steps are conducted solely on the main surface of the semiconductor substrate 128.

That is, according to the present invention, the diaphragm 100 is formed on the main surface of the substrate 128 using the known thin film forming technique, the reference pressure chamber 142 is formed by pouring an etchant into the etching hole 140 provided on the main surface of the substrate 128, and the reference pressure chamber 142 is sealed by applying an integrated circuit fabricating technique such as vacuum evaporation. In this way, it is possible to conduct all the wafer processing steps solely on the main surface side of the substrate 128, and to fabricate the sensor by what is called a single-sided processing.

As a result, according to the present invention, the manufacturing method is simplified in comparison with a conventional sensor processed on both sides, which leads to a reduction in costs.

(b) It is possible to form the diaphragm with a predetermined thickness such that it may process a thin and precisely dimensioned thickness utilizing the known thin film-forming technique.

Furthermore, it is possible to form the diaphragm 100 with high accuracy without being influenced by the non-uniform thickness of the semiconductor substrates 128 as in the prior art.

Therefore, it is possible to make the thickness and the size of the diaphragm 100 adequately small and highly accurate in accordance with a predetermined plane dimension and to obtain a small-sized and highly sensitive sensor.

(c) Since the reference pressure chamber 142 is formed between the diaphragm film 132 and the substrate 128, when an absolute pressure measuring type sensor is formed, airtight sealing of the reference pressure chamber 142 is easily and securely conducted by an integrated circuit fabricating technique such as vacuum evaporation. As a result, airtight bonding between the substrate 128 and the pedestal which has previously been an obstacle to mass production is obviated, and it is possible to simplify the fabrication of the sensor to a great extent.

(d) Since the strain gage 134 provided on the diaphragm film 132 is coated by the insulating protective film 136, when a plurality of strain gages are provided, each strain gage 134 is isolated from the others, thereby preventing leakage current due to a rise in temperature as in the case of P - N junction isolation, and enabling the sensor to be operated stably up to a high-temperature range.

(e) The present invention enables the semiconductor pressure sensor itself to be formed in an integrated manner.

That is, since it is possible to conduct all the processing steps by one-sided processing, as described above, and to make the diaphragm 100 very thin and small, it is easy to design and treat the semiconductor pressure sensor itself as one element which constitutes an integrated circuit and, in addition, since it is possible to make the sensor itself using substantially the same technique as the integrated circuit fabricating technique, it is possible to fabricate the pressure sensor in an integrated manner on the same substrate 128 as a predetermined signal processing circuit such as an amplifier.

From the experiments undertaken it has been confirmed that it is possible to make the dimension of a diaphragm of the present invention substantially less than 1/10 that of a diaphragm of a conventional semiconductor pressure sensor.

From the foregoing it will be understood that, since it is possible to form a thin and small diaphragm, the present invention makes it possible to provide a small-sized and highly accurate semiconductor pressure sensor, and that since it is possible to fabricate the sensor by what is called single-sided processing, mass production is made very easy and it is possible to produce a sensor at low cost.

EXAMPLES

Examples of the second embodiment will be explained hereinafter.

(a) First Example

A first example of the second embodiment will be explained with reference to FIGS. 9 and 10.

In this semiconductor pressure sensor, the semiconductor substrate 128 is formed of a single-crystal silicon substrate, and the pressure receiving region of the single-crystal silicon substrate 128 is covered with the disappearing film 130.

The disappearing film 130 is produced by forming a polysilicon film over the entire main surface of the single-crystal silicon substrate 128 to a thickness of 100 nm by low pressure CVD and photoetching this to a configuration and a dimension which are equivalent to those of the pressure receiving region.

The entire main surface of the disappearing film 130 in the pressure receiving surface is next coated with the 300 nm-thick diaphragm film 132 of silicon nitride ($Si_3N_4$). The strain gages 134 - 1, 134 - 2, 134 - 3 and 134 - 4 are provided at predetermined positions on the surface of the diaphragm film 132. The strain gages 134 in this example are provided by forming a polysilicon film on the surface of the diaphragm film 132 to a thickness of 100 nm by low pressure CVD, adding boron to the polysilicon as impurities by thermal diffusion or ion implantation and diffusing it thereinto so as to form a P-type semiconductor, and thereafter removing unnecessary portions by photoetching.

The entire surface of the strain gages 134 and the diaphragm film 132 are covered with silicon nitride as the 100 nm- thick insulating protective film 136 by low pressure CVD.

After the disappearing film 130, the diaphragm film 132, and the insulating protective film 136 are formed on the main surface of the substrate 128, an etching hole 140 of 2 $\mu$m in diameter is formed at a predetermined position of the pressure receiving region such as to penetrate the insulating protective film 136 and the diaphragm film 132 and reach the disappearing film 130.

An anisotropic etchant is poured onto the substrate 128 through the etching hole 140.

In this example, potassium hydroxide (KOH) water solution is used as the anisotropic etchant, and when the etchant is poured into the etching hole 140, etching proceeds with the hole 140 as its center.

When the etchant is poured into the etching hole 140, the disappearing film 130 is etched and removed in the horizontal direction at a predetermined speed, as shown in FIGS. 18(b) and 18 (c). Simultaneously with this, the silicon substrate 128 is etched and removed in the vertical direction to a predetermined depth, as shown in FIG. 18, thereby forming a cavity which constitutes the reference pressure chamber 142.

Since the diaphragm film 132 and the insulating protective film 136 situated above the reference pressure chamber 142 are made of an etching-resistant material, namely, silicon nitride, they are only slightly etched, and the pressure receiving region of the laminated film consisting of the diaphragm film 132 and the insulating protective film 136, namely, the region in which the disappearing film 130 is provided functions as the movable diaphragm 100 with respect to the reference pressure chamber 142.

Since each of the strain gages 134 is coated with and sandwiched between the diaphragm film 132 and the insulating protective film 136, it is not influenced at all by the etchant.

After the reference pressure chamber 142 and the movable diaphragm 100 are formed in this manner, a metal or insulating material is deposited onto the insulating protective film 136 to such a thickness as to seal the etching hole 140 by vacuum evaporation or sputtering, and an unnecessary portion is then removed by photoetching, thereby forming the sealing member 144.

Thus, the reference pressure chamber 142 is sealed while the pressure of the interior is maintained at a vacuum.

The portions of the insulating protective film 136 at both ends of the strain gage 134 are removed by photoetching so as to form the connecting holes 146. The connecting holes 146 are covered with an aluminum evaporation film and photoetched into an appropriate configuration so as to form the electrodes 138.

The semiconductor pressure sensor of this example having the above-described structure detects the absolute pressure applied from the upper side of the movable diaphragm 100 as a change in the resistance of the strain gage 134 and produces a signal which is proportional to the absolute pressure through the electrodes 138.

It has been confirmed from the experiments carried out on this example that it is possible to make the diameter of the diaphragm 100 as small as 50 $\mu$m and the thickness as thin as 0.5 $\mu$m, and to obtain an excellent output sensitivity of more than 2 mV/V with respect to a pressure of 100 KPa. It is therefore understood that according to the first example of the second embodiment it is possible to make the thickness and the dimension of the diaphragm film adequately small and realize a small-sized sensor displaying high sensitivity.

(b) Second Example

A second example of the second embodiment will here be described. The semiconductor pressure sensor of this example is a differential pressure measuring type sensor. The same reference numerals are provided for those elements which are the same as those in the first example, and explanation thereof will be omitted.

FIG. 11 is an explanatory plan view of the second example of the sensors of the second embodiment, and FIG. 12 is a schematic explanatory sectional view thereof.

In this sensor, the surface of the single-crystal silicon substrate 128 is coated with the rectangular polysilicon disappearing film 130, and thereafter the diaphragm film 132, the strain gage 134, the insulating protective film 136 and the etching hole 140 are provided in the same way as in the first example.

When the anisotropic etchant of potassium hydroxide (KOH) water solution is poured into the etching hole 140, the reference pressure chamber 142 of a rectangular configuration in conformity with the configuration of the disappearing film 130 and the movable diaphragm 100 are formed, as shown in FIGS. 11 and 12.

This example is characterized in that the strain gage 134 is formed on one side of the rectangular diaphragm 100 and the etching hole 140 on the other side thereof. A pressure introducing cap 152 which communicates with the etching hole 140 is provided on the latter region, and a second pressure is applied to the reference pressure chamber 142.

Thus, a first pressure $P_1$ and a second pressure $P_2$ are applied to the top side and the back side, respectively, of the movable diaphragm 100, and a deflection which is proportional to the amount of the differential pressure is produced on the movable diaphragm 100. As a result, the semiconductor pressure sensor of this example can accurately detect the differential pressure of the first and second pressures as a change in the resistance of the strain gage 134.

Though the insulating protective film 136, the connecting holes 146 and the electrodes 138 are omitted in FIGS. 11 and 12 for the purpose of a better understanding, these elements are provided in the same way as in the first examples of the second embodiment.

(c) Third Example

Figure 13:
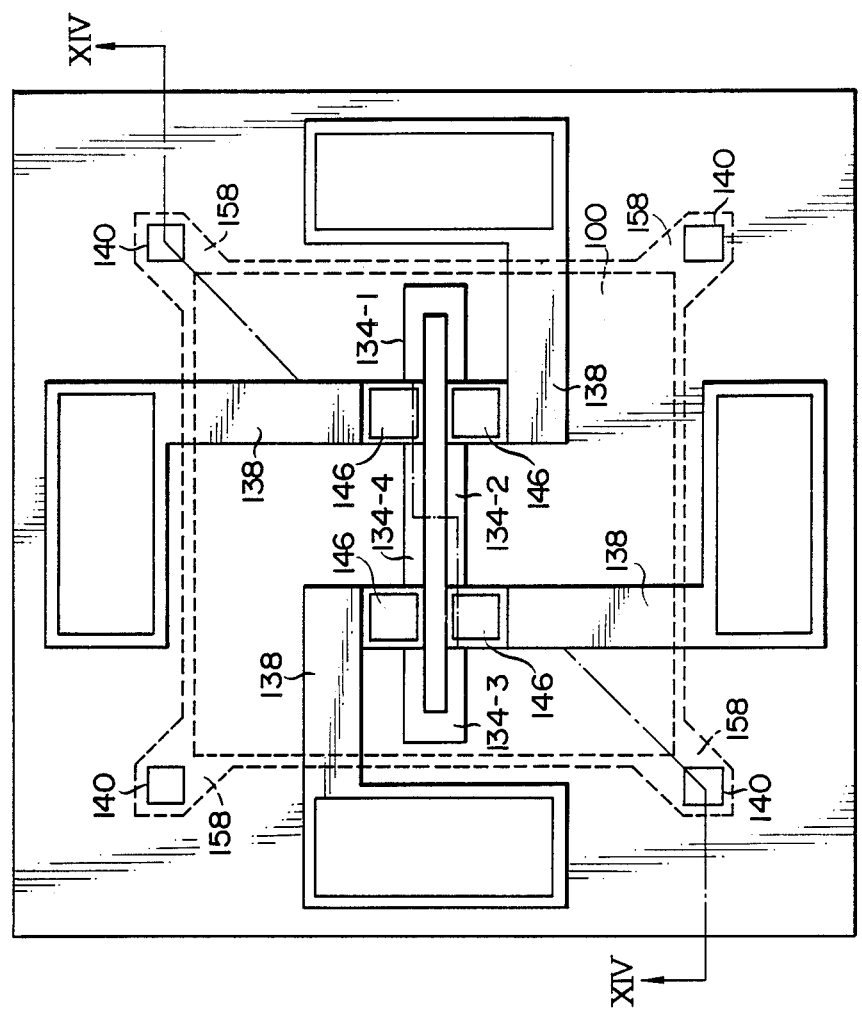
FIGS. 13 and 14 are schematic explanatory views of a still further embodiment of the present invention.
Figure 14:
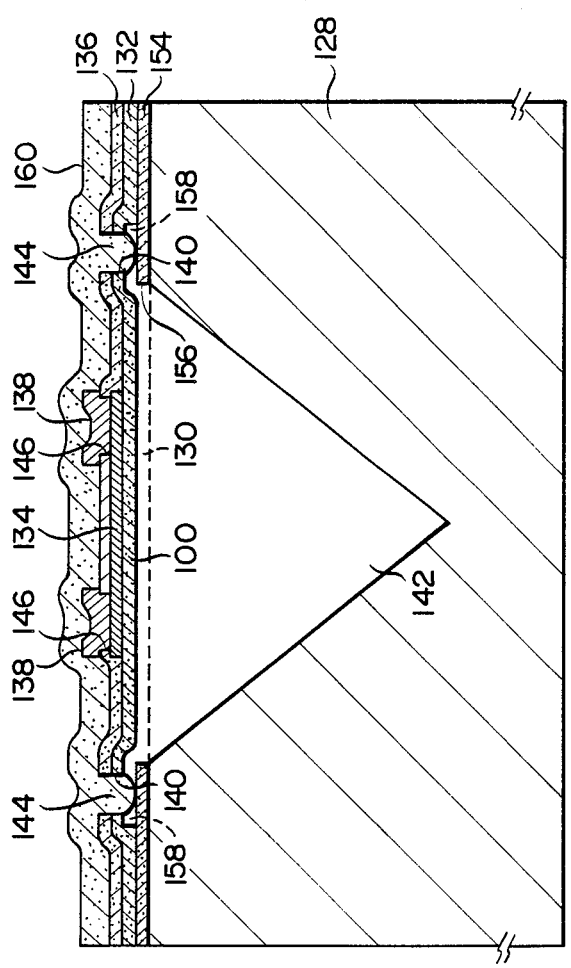

A third example of the second embodiment will be explained in the following with reference to the drawings. FIG. 13 is an external plan view of the semiconductor pressure sensor of the third example, and FIG. 14 is a schematic explanatory view thereof, taken along the line VI—VI in FIG. 13. The same reference numerals are provided for those elements which are the same as those in the first and second examples of the second embodiment, and explanation thereof will be omitted.

In this sensor, the semiconductor substrate 128 is made of a single-crystal silicon having the plane (100), and the main surface of the pressure receiving region of the single-crystal silicon substrate 128 is coated with the disappearing film 130 of a predetermined configuration.

This example is characterized in that the disappearing film 130 is formed in the following steps.

An insulating film 154 of silicon nitride ($Si_3N_4$) is formed over the entire main surface of the substrate 128 to a thickness of 100 nm by low pressure CVD, and a square opening 156 is formed in a region equivalent to the pressure receiving region of the insulating film 154 by photoetching. The opening 156 is covered with the disappearing film 130 of a predetermined configuration which is formed by low pressure CVD to a thickness of 100 nm.

In this example, the configuration of the disappearing film 130 is made substantially square in such a manner as to cover the peripheral portion of the opening of the insulating film 154 and to have a projecting area 158 at each corner of the square.

The diaphragm film 132 of silicon nitride is formed over the disappearing film 130 and the entire main surface of the single-crystal silicon substrate 128 by low pressure CVD to a thickness of 200 nm.

In the same way as in the first example, the strain gages 134 - 1, 134 - 2, 134 - 3 and 134 - 4 are made at predetermined positions in the pressure receiving region by low pressure CVD and photoetching, and the insulating protective film 136 of silicon nitride is formed over the entire surface of the strain gages 134 and diaphragm film 132 to a thickness of 200 nm by low pressure CVD.

In the four projecting areas 158, four etching holes 140 are formed such as to penetrate the insulating protective film 136 and the diaphragm film 132 and to reach the silicon disappearing film 130, as shown in FIG. 13, and an anisotropic etchant of potassium hydroxide (KOH) water solution is poured onto the substrate 128 through the etching holes 140.

Thus, the entirety of the disappearing film 130 and a part of the substrate 128 are etched to be removed, thereby forming the reference pressure chamber 142 and the movable diaphragm 100, as described above.

Thereafter the connecting holes 146 are provided on the insulating protective film 136 at both ends of the strain gage 134 and the electrodes 138 are formed through the connecting holes 146.

A silicon nitride film 160 is then formed over the entire surface of the insulating protective film 136 to a thickness of 500 nm by plasma CVD. The silicon nitride film 160 acts as the sealing member 144 for each of the etching holes 140, and serves for passivation of the surface of the sensor.

The experiments undertaken have proved that the side of the square of the movable diaphragm 100 may be made as small as 100 $\mu$m and the thickness as thin as 0.9 $\mu$m, and that the sensor has the efficient output sensitivity of more than 3 mV/V with respect to the pressure of 100 KPa.

It will therefore be understood that the third example also enables the dimension and the thickness of the diaphragm to be made sufficiently small and a small and highly sensitive sensor to be realized.

(d) Fourth Example

A fourth example of the second embodiment will now be explained. The same reference numerals are provided for those elements which are the same as those in the first to third examples of the second embodiment, and explanation thereof will be omitted.

Figure 15:
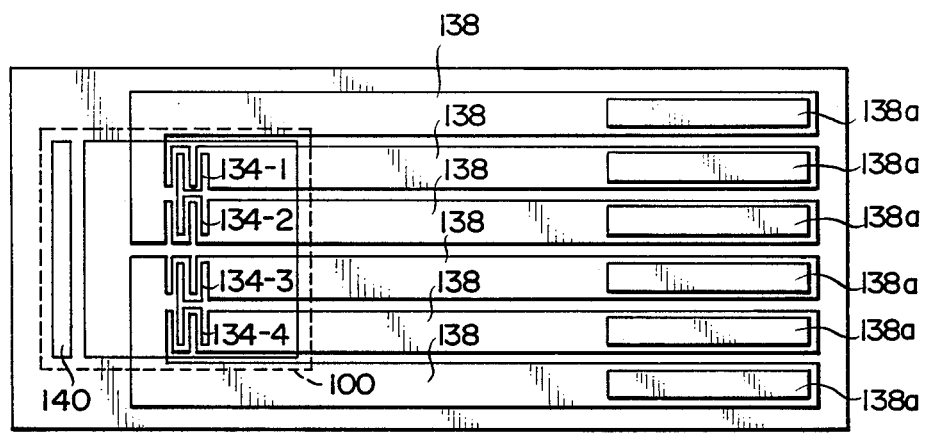
FIGS. 15 and 16 are schematic explanatory views of a still further embodiment of the present invention.
Figure 16:
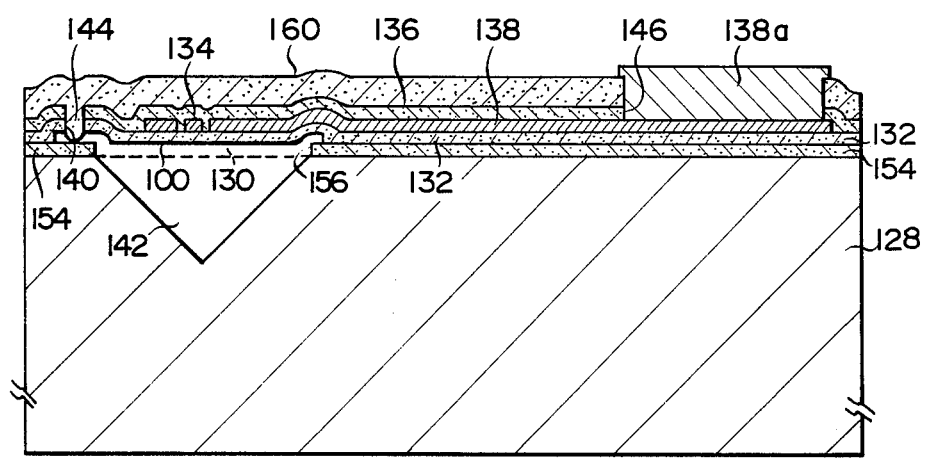

FIG. 15 is a plan view of the fourth example of the semiconductor pressure sensors of the second embodiment, and FIG. 16 is a sectional explanatory view thereof.

In the sensor of this example as well as that of the third example, the main surface of the substrate 128 is coated with the insulating film 154, and the square opening 156 of 100 $\mu$m square is formed at one end thereof. The disappearing film 130 is formed on the opening 156 and the entirety of the disappearing film 130 and the insulating film 154 is covered with the diaphragm film 132. The plurality of strain gages 134 - 1, 134 - 2, 134 - 3 and 134 - 4 are provided on the diaphragm film 132 at predetermined positions in the pressure receiving region, as shown in FIG. 15.

This example is characterized in that the plurality of electrodes 138 which are connected to both ends of the strain gages 34 - 1 ... 34 - 4 are extendingly provided to the other end of the substrate across the movable diaphragm 100.

The entire surface of the diaphragm film 132 provided with the strain gages 134 and the electrodes 138 is coated with the insulating protective film 136, and at one end thereof the etching hole 140 is formed, as is the case with the third example. By pouring an etchant into the etching hole 140 the square movable diaphragm 100 and the reference pressure chamber 142 are formed.

The silicon nitride film 160 is formed on the insulating protective film 136 to a predetermined thickness in the same way as in the third example of the second embodiment, which is used as the sealing member 144 for sealing the etching hole 140.

The connecting holes 146 which communicate with the electrodes 138 are formed on the silicon nitride film 160 at the other end of the substrate 128, and connecting terminals 138a are provided therein.

As described above, since the diaphragm 100 is formed at one end of the substrate 128 and the connecting terminals at the other end, the electrodes 138 are not disposed at the movable diaphragm 100 side. Therefore, this sensor is suitable for a sensor for measuring the pressures of various liquids and organisms.

From the experiments undertaken it has been confirmed that it is possible to make the dimension of the substrate 128 as small as 150 $\mu m \times 500$ $\mu m$. Therefore it will be understood that according to this example a microminiature semiconductor sensor is realizable.

Fifth Example

A fifth example of the second embodiment will be described. This example is characterized in that a semiconductor pressure sensor is integrally provided with an integrated circuit and is used what is called an integrated semiconductor pressure sensor.

A semiconductor pressure sensor 200 of the present invention which has been explained in the first and third examples is formed at a predetermined position of the silicon substrate 128. On the silicon substrate 128 are provided an integrated circuit 300 for amplifying the output of the pressure sensor 200 and processing a signal, a lead for connecting the sensor 200 with the integrated circuit 300, and a plurality of electrodes 400 for externally connecting them.

Thus, in this example, it is possible to make the semiconductor pressure sensor so small as to be regarded as one component of the integrated circuit and, in addition, it is fabricated by a single-sided processing using the same processing steps as those for the integrated circuit.

It will therefore be understood that the fifth example is preferable in the case of fabricating a semiconductor pressure sensor integrally with an integrated circuit as what is called an integrated sensor.

(e) Other Examples

Although the case of using the laminated film of the diaphragm film 132 and the insulating protective film 136 as the movable diaphragm 100 is illustrated in the aforementioned examples, the second embodiment is not limited thereto. For example, it is possible to use the movable diaphragm 100 which consists of a laminated film sandwiched between silicon nitride films as the movable diaphragm 100. If the thick diaphragm 100 is required, a three-layered film consisting of a silicon nitride film, a polysilicon film and a silicon nitride film is preferable.

Although silicon nitride is used as the diaphragm film 132 and the insulating protective film 136 in the examples, other insulating materials which can be deposited stably onto the silicon substrate 128 and the etching speed of which is much slower than that of silicon may be used, e.g., alumina ($Al_2O_3$), sapphire ($Al_2O_3$), or calcium fluoride ($CaF_2$).

In these examples, polysilicon is used as the strain gage 134, and it is possible to recrystallize polysilicon to single-crystal silicon in order to further improve the sensitivity. Other materials which can be deposited stably on the diaphragm film and exhibit sufficient piezoresistive effects may be used as a material for the strain gage 134.

Although polysilicon is used as the disappearing film 130 having an isotropic etching characteristic in these examples, this embodiment is not limited to this, and other materials which have an etching characteristic in the horizontal direction faster than the interface between the semiconductor substrate 128 and the diaphragm film 132, e.g., phosphorous glass, may be used as a material for the disappearing film 130.

As described above, the semiconductor pressure sensor of the present invention which can be made small in size and high in accuracy will be widely used as a pressure sensor for barometers and tonometers, a pressure sensor for controlling automobile engines, a pressure sensor in industrial (plant) pressure transmitters, a pressure sensor for bioinstrumentation, and a pressure sensor for controlling robots, and for other purposes.

Third Embodiment

The feature of a third embodiment is constituted by that a small-sized and highly accurate pressure distribution detecting apparatus is formed using the semiconductor pressure sensor which is shown in the first or the second embodiments.

A pressure distribution detecting apparatus of this embodiment is composed of a semiconductor substrate, a plurality of semiconductor pressure sensors which are arrayed on the same substrate in a matrix, and a sensor scanning means for subsequently scanning each of the semiconductor pressure sensors and detecting an output signal thereof.

Each semiconductor pressure sensor is composed of an insulating diaphragm film which is made of an etching-resistant material and is formed on the main surface of the semiconductor substrate such as to cover the main surface, at least one strain gage which is provided at a predetermined position in the pressure receiving region of the diaphragm film, an insulating protective film which is made of an etching-resistant material and is formed on the diaphragm film such as to cover the diaphragm film, at least one etching hole which is formed such as to penetrate through the insulating protective film and the diaphragm film, and a reference pressure chamber which is formed by etching and removing a part of the semiconductor substrate through the etching hole, so that the distribution of the pressure applied to each of the semiconductor pressure sensors which are arrayed in a matrix is measured.

The pressure distribution detecting apparatus in accordance with this embodiment will be explained in more detail hereinunder.

This embodiment is characterized in that the surface of a semiconductor substrate is processed solely on one side, whereby a plurality of semiconductor pressure sensors which are arrayed in a matrix are integrally provided with the substrate.

Figure 19:
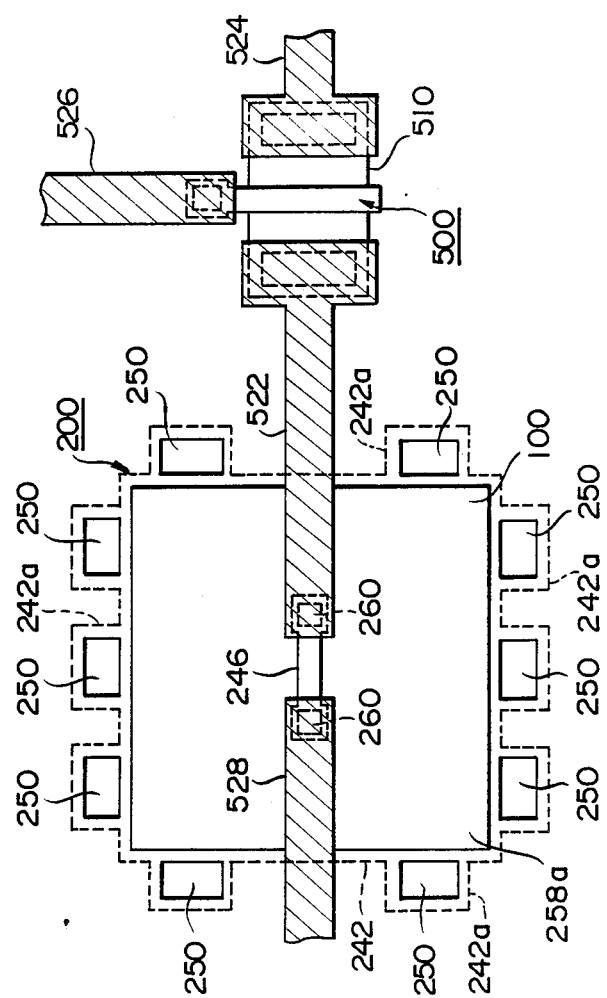
FIGS. 19 and 20 are explanatory views of the main part of a pressure distribution detecting apparatus according to the present invention.
Figure 20:
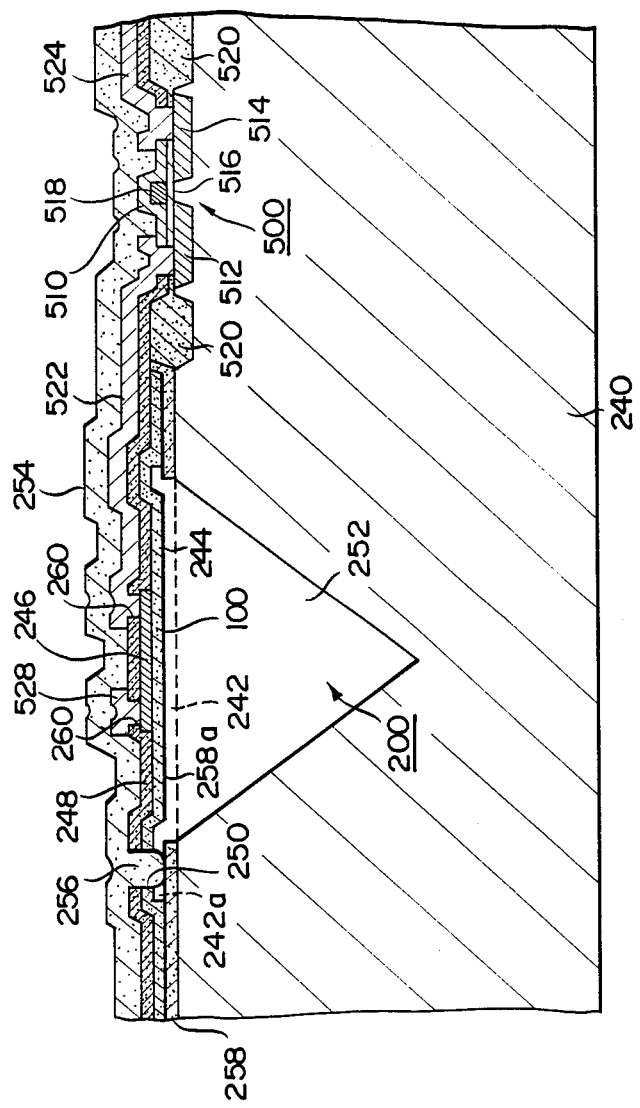

FIGS. 19 and 20 shows the structure of the pressure distribution detecting apparatus of this embodiment, wherein FIG. 19 is an explanatory partially enlarged plan view of the substrate, and FIG. 20 is an explanatory sectional view thereof.

Each of the semiconductor pressure sensors 200 which are arrayed on a semiconductor substrate 240 is composed of the semiconductor substrate 240, the main substrate being coated with an insulating diaphragm film 244 made of an etching-resistant material, and at least one strain gage 246 which is provided at a predetermined position in the pressure receiving region of the diaphragm film 244.

In order to protect the strain gage 246 from the etchant which is used during the sensor manufacturing steps, the strain gage 246 and the diaphragm film 244 are coated with an insulating protective film 248 made of an etching-resistant material.

At least one etching hole 250 is formed at a predetermined position in the pressure receiving region of each sensor 200 so as to penetrate the insulating protective film 248 and the diaphragm film 244, and a predetermined etchant is poured into the etching hole 250.

Etching is conducted utilizing the etching characteristic in the horizontal direction of the interface between the diaphragm film 244 of an etching-resistant material and the semiconductor substrate 240 to remove a part of the substrate, thereby forming a reference pressure chamber 252.

The laminated film consisting of the diaphragm film 244 and the insulating protective film 248 which faces and is situated above the reference pressure chamber 252 functions as the diaphragm 100.

After the reference pressure chamber 252 is formed, the etching hole 250 is sealed by a sealing member 256 while the interior of the reference pressure chamber 252 is maintained in a vacuum state.

In the pressure distribution detecting apparatus of this embodiment having a plurality of pressure sensors 200 which are provided in a matrix on the semiconductor substrate 240, when a pressure is applied from the main surface side of the substrate 240, the movable diaphragm 100 provided at the corresponding position is deflected by the amount proportional to the pressure, and this deflection changes the resistance of the strain gage 246 provided in the pressure receiving region.

By electrically detecting the change in the resistance of the strain gage 246 which is provided in each sensor 200, it is possible to measure the dynamic change in the pressure distribution simultaneously.

A thin film other than the diaphragm film 244 and the insulating protective film 248 may be laminated, if necessary, in this embodiment. In this case, the laminated film of these films serves as the movable diaphragm 100.

According to this embodiment, since the thickness of the movable diaphragm 100 takes a value equivalent to the sum of the thickness of the diaphragm film 244 and the insulating protective film 248, it is possible to form the diaphragm with a predetermined thickness such that it may process a thin and precisely dimensioned thickness utilizing the known thin film-forming technique.

Furthermore, it is possible to form the diaphragm 100 with high accuracy without being influenced by the non-uniform thickness of the semiconductor substrates 240 as in the prior art. Therefore, it is possible to make the thickness and the size of the diaphragm 100 adequately small and highly accurate in accordance with a predetermined dimension.

It will therefore be understood that the third embodiment enables the dimension and the thickness of the movable diaphragm 100 to be made sufficiently small with high precision in accordance with a predetermined dimension, and each sensor provided on the substrate 240 to be made very small and highly sensitive.

Furthermore, according to this embodiment, since it is possible to make each sensor 200 adequately small and highly sensitive, it is possible to array the sensors 200 on the substrate 240 in a matrix with high density, and to measure the dynamic change in pressure distribution with high two-dimensional resolution.

What is important in detecting pressure distribution using such an apparatus is how to fetch a signal from each of the sensors 200 which are arrayed in a matrix.

A method of measuring the detection signal of each sensor simultaneously by connecting power source to all the sensors 200 simultaneously may be considered. This method is, however, disadvantageous in that power consumption plural times that of each sensor is required and, therefore, if many sensors are provided, the power consumption thereof overheats the apparatus so that stable operation of the apparatus is made impossible.

For example, if 256 pressure sensors 200 the individual power consumption of which is 10 mW are arrayed, the power consumption of the apparatus in total is at least 2.56W. As a result, the temperature of a single silicon substrate 240 is raised by several tens of degrees centigrade due to heat developed, and stable operation of the apparatus is made impossible.

To solve this problem, the pressure distribution detecting apparatus of this embodiment is provided with a sensor scanning means 500 for subsequently connecting power source selectively to each semiconductor pressure sensor 200 and detecting the output signals of the respective sensors. The scanning means 500 scans each sensor 200 subsequently for the purpose of connecting power source thereto and detects the output signal of each sensor 200 synchronously with the scanning.

If a circuit element which has large power consumption is used as the sensor scanning means 500, it may unfavorably cause a temperature rise in the pressure sensor 200. It is therefore preferable to form the circuit using MOS type field effect transistors which consume small electric power.

Operation

The operation of this embodiment having the above-described structure will now be explained.

In the pressure distribution detecting apparatus of this embodiment, a predetermined measuring pressure having two-dimensional pressure distribution is applied to the main surface of the substrate on which a plurality of pressure sensors 200 are arrayed in a matrix.

Deflection is produced on the diaphragm 100 provided on each sensor 200, and the amount of the deflection of the movable diaphragm 100 is proportional to the pressure applied to each sensor in correspondence with the pressure distribution and it appears as a change in the resistance of the strain gage 246 provided on the diaphragm 100.

Since the apparatus of this embodiment subsequently scans each of the sensors 200 which are arrayed in a matrix and detects a change in the resistance of each sensor 200, it is possible to measure the dynamic change in two-dimensional pressure distribution simultaneously.

When the sensor scanning means is formed using a switching circuit including MOS type field effect transistors, the switching circuit selects a specific sensor from among the plurality of sensors 200 which are arrayed in a matrix by specifying a row and a line one by one.

Power source is connected to the selected pressure sensor 200 through the switching circuit and supplies current to the strain gage 246 of the sensor 200 to detect a change in the resistance of the strain gage 246 as an electric signal.

In this way, the row and the line of the matrix are subsequently changed over and scanned by the switching circuit, thereby enabling the dynamic change in the pressure distribution applied to each sensor to be measured simultaneously.

Characteristics

The characteristics of the pressure distribution detecting apparatus of this embodiment having the above-described structure and operation will be mentioned in the following.

(a) This embodiment enables the semiconductor pressure sensor 200 to be fabricated by what is called a single-sided processing, in other words, all the processing steps are conducted solely on the main surface of the semiconductor substrate 240.

That is, according to this embodiment, the diaphragm 100 is formed on the main surface of the substrate 240 using the known thin film forming technique, the reference pressure chamber 252 is formed by pouring an etchant into the etching hole 250 provided on the main surface of the substrate 240, and the reference pressure chamber 252 is sealed by applying an integrated circuit fabricating technique such as vacuum evaporation. In this way, it is possible to conduct all the wafer processing steps solely on the main surface side of the substrate 240, and to fabricate each sensor 200 by what is called a single-sided processing. As a result, according to the present invention, the manufacturing method is simplified in comparison with a conventional apparatus using a sensor processed on both sides, which leads to a reduction in costs.

(b) It is possible to form the diaphragm with a predetermined thickness such that it may process a thin and precisely dimensioned thickness utilizing the known thin film-forming technique.

Furthermore, it is possible to form the diaphragm 100 with high accuracy without being influenced by the non-uniform thickness of the semiconductors 240 as in the prior art.

Therefore, it is possible to make the thickness and the size of the diaphragm 100 adequately small and highly accurate in accordance with a predetermined dimension in comparison with a conventional sensor, and to make each sensor small-sized and highly sensitive. Accordingly, it is possible to produce a small-sized pressure distribution detecting apparatus which has very efficient resolution by arraying the sensors 200 formed in this way on the same substrate 240 in a matrix with high density.

(c) Since each sensor 200 is formed by a single-sided processing of the semiconductor substrate 240, as described above, a both-side aligning of the substrate 240 or a double-sided processing as in the prior art is obviated. As a result, non-uniformity of the characteristic of each sensor 200 is greatly reduced.

(d) Since power source is subsequently and selectively supplied to each of the semiconductor pressure sensors 200 which are arrayed in a matrix by the sensor scanning means 500, the power consumption required is equivalent to a value of the power consumption only for one sensor although many sensors are provided.

Furthermore, it is possible to reduce power consumption further by using the switching circuit composed of MOS type field effect transistors as the sensor scanning means 500.

The pressure distribution detecting apparatus of this embodiment has efficient characteristics as described above, and, especially, it is possible to measure a dynamic change in pressure distribution two-dimensionally with very high resolution.

The experiments carried out have proved that the two-dimensional resolution of the apparatus of this embodiment is less than 200 $\mu$m, and that it is possible to make an apparatus which will exhibit resolution more than 10 times that of a conventional apparatus.

Since such a semiconductor pressure sensors as that used in this embodiment has very high two-dimensional resolution, it can be widely used for various purpose; for example it will exhibit an efficient performance as a tactile sensor or a contact pressure sensor for a high-precision work robot or the like.

EXAMPLES

The concrete structure of this embodiment will now be explained with reference to the accompanying drawings.

(a) First Example

Figure 21:
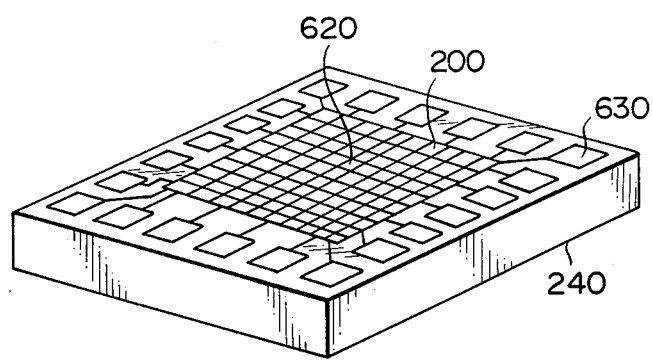
FIG. 21 is an explanatory external view of a substrate used for the apparatus shown in FIG. 19.

FIG. 21 shows a first example of a pressure distribution detecting apparatus of the third embodiment. A plurality of semiconductor pressure sensors 200 are arrayed in a matrix of n rows $\times$ m lines on the main surface of the semiconductor substrate 240, thereby forming a sensor matrix 620. Each sensor 200 is subsequently scanned by the sensor scanning means 500 which will be described later to detect the output signal thereof.

The pressure applied to the substrate 240 from the main surface side is two-dimensionally measured by the sensor matrix 620. If the sensor matrix 620 is repeatedly scanned by the sensor scanning means 500, a dynamic change in pressure distribution is measured simultaneously.

(Semiconductor Pressure Sensor)

FIGS. 19 and 20 show a partially enlarged schematic plan view and a sectional view, respectively, of the silicon substrate 240. In this example, the semiconductor substrate 240 is made of a P-type silicon substrate and a plurality of semiconductor pressure sensors 200 are arrayed in a matrix on the substrate 240.

Each sensor 200 includes a disappearing film 242 which covers the pressure receiving region of the silicon substrate 240 and the diaphragm film 244 which covers the disappearing film 242 and the main surface of the substrate 240.

The disappearing film 242 is used for specifying the configuration and the size of the movable diaphragm 100 of each semiconductor pressure sensor 200 and is formed of an isotropic etching material such as polysilicon.

In this example, in order to accurately coat the pressure receiving region of the substrate 240 with the disappearing film 242, the surface of the substrate 240 is first coated with an insulating film 258 of silicon nitride ($Si_3N_4$), an opening 258a is next formed at a portion corresponding to the pressure receiving region of the insulating film 258 by photoetching, and thereafter the disappearing film 242 is formed on the insulating film 258 such as to cover the opening 258a.

The configuration of the disappearing film 242 is substantially square, as shown in FIG. 19, and a plurality of projecting regions 242a are formed around the square such as to extend toward the outside.

The diaphragm film 244 is made of silicon nitride, and at a predetermined position in the receiving region of the diaphragm film 244 the strain gage 246 consisting of P-type polysilicon 40 $\mu$m in length, 10 $\mu$m in width and 0.15 $\mu$m in thickness are provided.

In order to protect the strain gage 246 from a later-described etchant, the surfaces of the strain gage 246 and the diaphragm film 244 are coated with the insulating protective film 248, which is made of silicon nitride of 0.15 $\mu$m thick in this embodiment.

Each sensor 200 is provided with a plurality of etching holes 250 in the projecting regions 242a such as to penetrate the insulating protective film 248 and the diaphragm film 244, and an anisotropic etchant such as potassium hydroxide (KOH) water solution is poured onto the substrate 240 through the etching holes 250.

In this manner, the entire disappearing film 242 and a part of the substrate 240 are removed by etching, thereby forming the reference pressure chamber 252 and the movable diaphragm 100.

When the etchant is poured into the etching holes 250, the disappearing film 242 is etched to be removed in the horizontal direction at a predetermined speed, and at the same time the substrate 240 is etched to be removed in the vertical direction by a predetermined depth together with the horizontal etching, thereby forming the reference pressure chamber 252.

Since the diaphragm film 244 and the insulating protective film 248 situated above the reference pressure chamber 252 are formed of an etching-resistant material, they are only slightly etched. As a result, the pressure receiving region, namely, the region in which the disappearing film 242 is provided, of a laminated film consisting of the diaphragm film 244, the insulating protective film 248 and a later-described second insulating protective film 254 functions as the movable diaphragm 100 with respect to the reference pressure chamber 252.

If the disappearing film 242 is formed into a 100 $\mu$m × 100 $\mu$m square, the movable diaphragm 100 and the reference pressure chamber 252 are also formed into a substantially 100 $\mu$m × 100 $\mu$m square.

In the sensor 200 in this example, after leads 522 and 528 which are connected to the strain gage 246 and other leads are formed, the entire surface of the insulating protective film 248 is coated with a second insulating protective film 254 of silicon nitride while the pressure within the reference pressure chamber 252 is maintained at a vacuum. Thus, the second insulating protective film 254 functions as the sealing member 256 for sealing each etching hole 250, and also serves for passivation of the surface of the sensor.

In this manner, in the pressure distribution detecting apparatus of this example, a plurality of absolute pressure detecting sensors 200 are formed on the main surface of the semiconductor substrate 240 in a matrix of n rows × m lines.

Sensor Scanning Means

In the pressure distribution detecting apparatus of this example, power source is subsequently supplied to each of the semiconductor pressure sensors 200 which are arrayed in a matrix on the main surface of the substrate by the sensor scanning means 500, and an output signal is output.

In this example, the sensor scanning means 500 is composed of an N-channel MOS field effect transistor (hereinunder referred to as "FET") 510 which corresponds to each of the sensors 200 and is disposed on the main surface of the substrate 240 adjacently to each other. The FETs 510 are subsequently changed over so as to scan each of the sensors 200 in a matrix.

The FET 510 includes an N-type source 512 and a drain 514 which are formed by ion implantation, a gate oxide film 615, a polysilicon gate 518 and an isolation oxide film 520.

The source 512 in each FET 510 is connected to one end of the strain gage 246 provided on the corresponding sensor 200, and the drain 514 is connected to the positive side of the power source.

The FET 510 controls the connection of the corresponding strain gage and power source by a control signal applied to the gate 518 through the lead 526.

Figure 22:
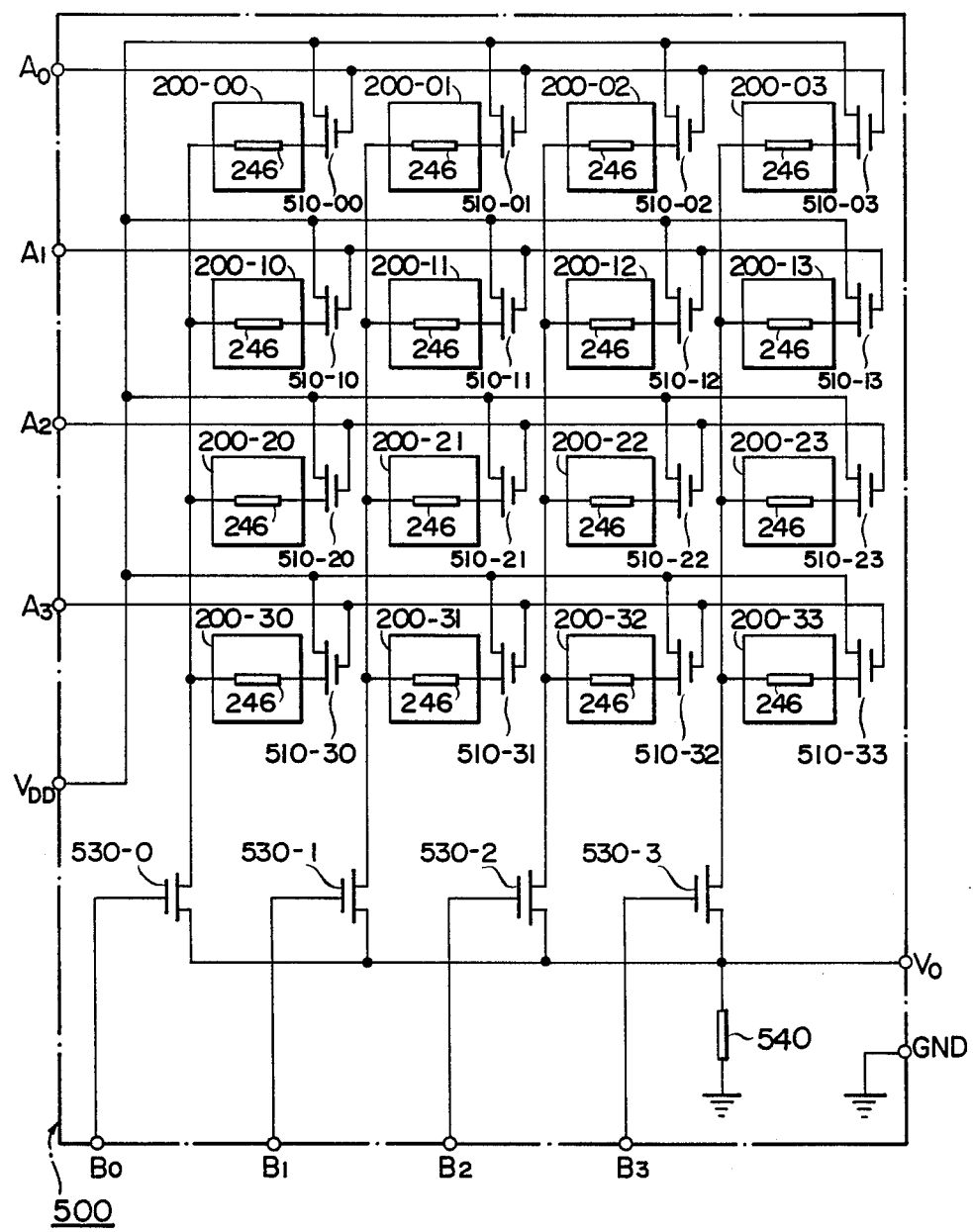
FIG. 22 is a circuit diagram showing the principle of a sensor scanning means used for the apparatus shown in FIG. 19.

The lead 528 which is connected to the one end of the strain gage 246 is connected to a signal detection circuit (not shown) through the FET 530 shown in FIG. 22.

In this manner, in the apparatus of this example, a pair of the sensor 200 and the FET 510 constitute one unit, and these units in combination constitute a sensor matrix 620 on n rows × m lines.

Each of the leads 522, 524, 526 and 528 is coated by a film and is formed on the insulating protective film 248, and each of the leads is connected to the strain gage 246 through the connecting holes 260 provided on the insulating protective film 248 in correspondence with both ends of the gage 246.

FIG. 22 is a circuit diagram of the sensor scanning means 500 of this example. In this example, the sensors 200 which are arrayed on the substrate 240 in a matrix of 4 rows × 4 lines are illustrated to simplify explanation.

The symbols A0 to A3 represent terminals for selecting a row of the sensor matrix 620, and B0 to B3 terminals for selecting a line in the selected row.

The symbol VDD represents a power supply terminal of each sensor 200, V0 a signal output terminal, and Gnd a ground terminal.

The FETs 530 - 0, 530 - 1 . . . 530 . . . 3 are formed on the substrate 240 in correspondence with the respective lines. One end of each FET 530 is connected to the output terminal Vo through a common line, and the other end to each sensor 200. The gates are connected to the respective terminals B0 to B3 for selecting a line.

In order to output the output of the sensor 200 which is specified by the terminals A0 to A3 for selecting a row and the terminal B0 to B3 for selecting a line as a voltage signal, a resistor 540 for comparison is connected between the output terminal Vo and the ground.

The operation of the sensor scanning means 500 of this example having the above-described structure will be explained hereinunder.

When a positive voltage is applied to one of the terminals A0 to A3 for selecting a row, e.g., to the terminal A0 and the voltages of the other terminals are dropped to 0, the FET 510 - 00 to 510 - 03 in the row A0 are only turned on and supply voltage is applied from the power supply terminal VDD to the strain gages 246 of the sensors 200 - 00 and 200 - 03 in the row A0.

At this time, if a positive voltage is applied to one of the terminals B0 to B3 for selecting a line, e.g., to the terminal B2, and the voltages of the other terminals are dropped to 0, FET 530 - 2 is turned on and the sensors 200 - 02, 200 - 12, 200 - 22 and 200 - 32 are thereby connected to the output terminal V0.

As a result, the sensor 200 - 02 specified by the row A0 and the line B2 is selected, and current flows to the strain gage 246 - 02 of the sensor 200 - 02, the current then flowing to the resistor 540.

In this way, the voltage applied to the diaphragm 100 of the sensor 200 - 02 is converted into the current which flows to the resistor 540 for comparison as a change in the resistance of the strain gage 246, and is further converted into a change in the drop of voltage of the resistor 540 for comparison, thereby being output through the output voltage V0.

Thus, according to the sensor scanning means 500 of this example, a row is selected by the terminals A0 to A3 for selecting a row, and a line is selected by the terminals B0 to B3 for selecting a line, thereby specifying the sensor 200 which is at the intersection of the selected row and line, and the detection signal of the senor is obtained through the output terminal V0.

Therefore, by repeatedly scanning the sensor matrix 620, it is possible to measure the dynamic change in the pressure distribution applied to the matrix surface simultaneously.

Since the resistor 540 for comparison of this example is provided on the main surface of the substrate 240 using polysilicon which is formed by the same processing steps as those for the strain gage 246, the temperature compensation for coefficient of resistance temperature is equally to that of the strain gage 246.

(Pressure Applying Means)

A pressure applying means 700 used for the pressure distribution detecting apparatus of this example will now be explained.

Figure 23:
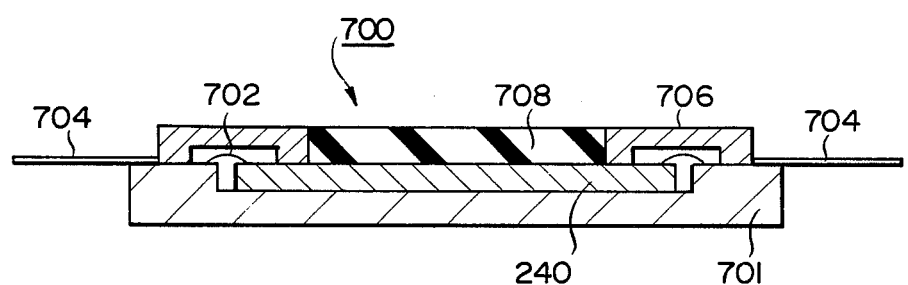
FIGS. 23 and 24 are explanatory views of a means for applying a pressure used for the apparatus shown in FIG. 19.

FIG. 23 shows a pressure distribution detecting apparatus with the pressure applying means provided on the substrate 240. The substrate 240 is formed as shown in FIG. 21, a plurality of the pressure sensors 200 being arrayed on the main surface in a matrix of 10 rows×10 lines.

The under surface of the substrate 240 is adhered to a ceramic base 701, and each electrode 630 provided on the main surface of the substrate 240 is bonded to a thick-film electrode provided on the base 701 through a lead 702, thereby being connected to an external lead 704.

In order to protect the electrodes 630 and the leads 702 which are arranged on the periphery of the main surface of the substrate 240, caps 706 are inserted between the periphery of the main surface of the substrate 240 and the surface of the base 701.

Planar rubber elastic members 708 are disposed on the upper portion of the sensor matrix 620 provided on the silicon substrate 240 in contact therewith, and the contact pressures of the elastic members 708 are transmitted to the sensor matrix 620.

Thus, according to the apparatus of this example, the pressures applied to the elastic members 708 are transmitted to the sensor matrix as they are, and it is therefore possible to detect pressure distribution accurately.

Figure 24:
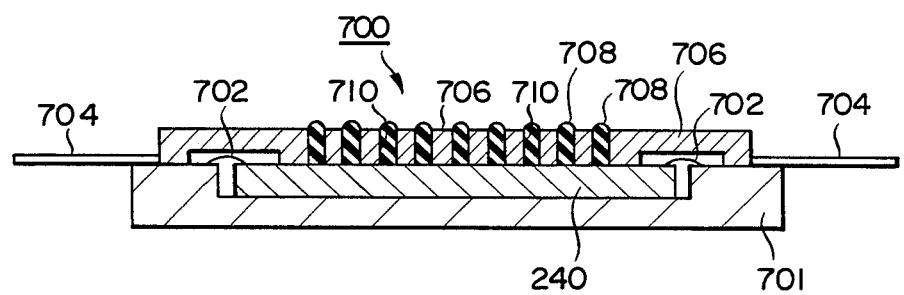

FIG. 24 shows an improved pressure applying means 700. In this means, the cap 706 and the elastic members 708 are improved further so as to detect pressure distribution with higher two-dimensional resolution.

The cap 706 is formed in such a manner as to come into contact with the entire surface of the substrate 240, and a plurality of through holes 710 are formed in a matrix at positions at which the cap 706 corresponds to each diaphragm 100 of the sensor matrix 620. Each of the through holes 710 is filled with the elastic member 708 which is formed by injection, and the pressures applied from the top side of the cap 706 are transmitted individually to the respective sensors 200 through the respective elastic members 708. Since the pressure applying means of this example is so designed as to transmit the applied pressure individually to each sensor 200, it is possible to measure the pressure distribution more exactly than the apparatus shown in FIG. 23.

It is possible to make the apparatus of this example as small as 10 mm×10 mm×2 mm, and the experiments undertaken have proved that it exhibits efficient resolution of 0.4 mm.

(b) Second Example

Figure 25:
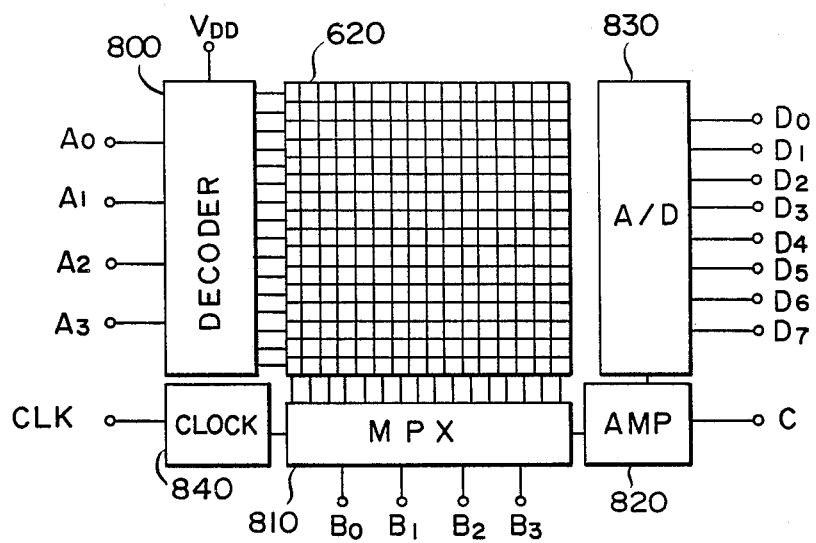
FIG. 25 is an explanatory view of another embodiment of a pressure distribution detecting apparatus according to the present invention.
Figure 26:
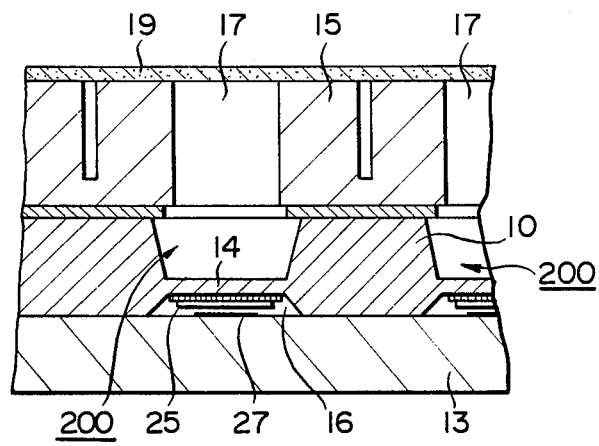
FIG. 26 is an explanatory view of the main part of a conventional pressure distribution detecting apparatus.

A second example of the third embodiment is shown in FIG. 25. 256 sensors 200 in total are arrayed on the main surface of the substrate in a matrix of 16 rows×16 lines in the same way as in the first example.

The apparatus of this example includes a binary-hexadecimal decoder 800 for selectively connecting power source to each row of the sensor matrix 620, a multiplexer 810 which functions as a signal selector for selecting each row of the sensor matrix 620, an amplifier 820 for amplifying the voltage of the output signal of the sensor 200 selected by the decoder 800 and the multiplexer 810, an 8-bit A/D converter 830 for converting the analog signal of the sensor 200 which is amplified by the amplifier 820 to a digital signal, and a clock circuit 840 for supplying a synchronous signal to each circuit.

In the apparatus of this example, 4-bit selective signals A0, A1, A2, and A3 which are input to the decoder 800 select a row of the sensor matrix 620 and 4-bit selective signals B0, B1, B2 and B3 which are input to the multiplexer 810 select a line of the sensor matrix 620. The signal of the selected sensor 200 is amplified by the amplifier 820, and is fetched as an analog output C in the order of voltage and an 8-bit output signal D0, D1, D2, ... or D7 which is output from the A/D converter 430.

The silicon substrate 240 in this example is 10 mm×10 mm in dimension, and each of the circuits 800 to 840 is composed of MOSFETs.

It is possible to repeatedly scan the sensor matrix 620 at a period of less than 1 m sec, thereby measuring the dynamic change in pressure distribution simultaneously.

From the experiments carried out it has been confirmed that the apparatus of this example exhibits efficient two-dimensional resolution of 0.2 mm.

Although the substrate 240 of each sensor 200 is coated with the disappearing film 242 in each of the examples of the third embodiment, this embodiment is not limited to this case, and it is possible to fabricate a good sensor 200 without providing the disappearing film 242.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A method of manufacturing a semiconductor pressure sensor comprising the steps of:
   forming an insulating diaphragm film of an etching-resistant material on the main surface of a semiconductor substrate;
   forming at least one strain gage at a predetermined position of a pressure receiving region of said diaphragm film;
   forming an insulating protective film of an etching-resistant material on said strain gage;
   forming at least one etching hole at a predetermined position of said pressure receiving region such as to penetrate through said insulating protective film and said diaphragm film and reach said semiconductor substrate;
   forming a movable diaphragm and a reference pressure chamber of a predetermined configuration by etching and removing a part of said semiconductor substrate on pouring an etchant into said etching hole;
   sealing at least one etching hole by a sealing member;
   forming a plurality of connecting holes on said insulating protective film at both ends of said strain gage; and
   forming a plurality of electrodes which are connected to said strain gage through said connecting holes, wherein all the processing steps are conducted solely on the main surface of said semiconductor substrate which is provided with said strain gage.

2. A method of manufacturing a semiconductor pressure sensor according to claim 1, wherein said semiconductor substrate is formed of a silicon substrate;
   said diaphragm film is formed by coating the main surface of said silicon substrate with a silicon nitride film of a predetermined thickness;
   said strain gage is formed by coating said diaphragm film with a polysilicon film of a predetermined thickness at a predetermined position in said pressure receiving region, adding boron to said silicon and diffusing said boron in said silicon as impurities, thereby forming a P-type semiconductor, and thereafter etching an unnecessary portion by photoetching;
   said protective film is an insulating protective film provided by forming a silicon nitride film of a predetermined thickness over the entire main surface on which said strain gage is provided;
   said reference pressure chamber is a substantially semi-circular reference pressure chamber formed by etching and removing a part of said semiconductor substrate by means of isotropic etching which is performed on pouring an isotropic etchant into said etching hole;
   said sealing member for sealing said etching hole is formed by depositing a metal or an insulator on said insulating protective film to such a thickness which enables said etching hole to be sealed by vacuum evaporation or sputtering after said reference pressure chamber is formed, and thereafter removing an unnecessary portion by photoetching.

3. A method of manufacturing a semiconductor pressure sensor according to claim 1, wherein said semiconductor substrate is made of a silicon substrate having the plane (100) as the main surface;
   said diaphragm film is formed by coating the main surface of said silicon substrate with a silicon nitride film of a predetermined thickness;
   said strain gage is formed by coating said diaphragm film with a polysilicon film of a predetermined thickness at a predetermined position in said pressure receiving region, adding boron to said silicon and diffusing said boron in said silicon as impurities, thereby forming a P-type semiconductor, and thereafter etching an unnecessary portion by photoetching;
   said protective film is an insulating protective film of a silicon nitride film of a predetermined thickness formed over the entire main surface on which said strain gage is provided; and
   said reference pressure chamber is a rectangular reference pressure chamber having a triangular section which is formed by etching and removing a part of said semiconductor substrate by means of anisotropic etching which is performed on pouring an anisotropic etchant into said etching hole.

4. A method of manufacturing a semiconductor pressure sensor according to claim 3, wherein said sealing member for sealing said etching hole is a second insulating protective film which is formed over the entire surface of said insulating protective film.

5. A method of manufacturing a semiconductor pressure sensor according to claim 1, wherein said diaphragm film is formed by forming a silicon nitride film of a predetermined thickness over the entire main surface of said silicon semiconductor substrate;
   in said step of forming said etching hole, a plurality of etching holes are provided at predetermined positions in said pressure receiving region of said diaphragm film; and
   in said step of forming said reference pressure chamber, isotropic etching is conducted so as to form a reference pressure chamber composed of substantially semi-circular cavities communicating with each other.

6. A method of manufacturing a semiconductor substrate comprising the steps of:
   forming a disappearing film in a pressure receiving region of the main surface of a semiconductor substrate,
   forming an insulating diaphragm film of an etching-resistant material on the main surface of said semiconductor substrate in such a manner as to coat said disappearing film,
   forming at least one strain gage at a predetermined position of a pressure receiving region of said diaphragm film,
   forming an insulating protective film of an etching-resistant material on said diaphragm film such as to cover said strain gage;
   forming at least one etching hole at a predetermined position of said pressure receiving region such as to penetrate through said insulating protective film and said diaphragm film and reach said disappearing film, forming a reference pressure chamber of a predetermined configuration and a movable diaphragm covering said reference pressure chamber by etching and removing a part of said semiconductor substrate and the entirety of said disappearing film on pouring an anisotropic etchant into said etching hole, sealing at least one etching hole by a sealing member as occasion demands, and forming connecting holes on said insulating protective film at both ends of said strain gage, and forming electrodes which are connected to said strain gage-through said connecting holes, wherein all the processing steps are conducted solely on the main surface of said semiconductor substrate which is provided with said strain gage.

7. A method of manufacturing a semiconductor substrate according to claim 6, wherein said step of forming said disappearing film includes steps of:

coating the main surface of said semiconductor substrate with a disappearing film having an isotropic etching characteristic; and forming said disappearing film into a predetermined configuration along said pressure receiving region.

8. A method of manufacturing a semiconductor substrate according to claim 6, wherein said step of forming said disappearing film includes the steps of:

coating the main surface of said semiconductor substrate with an insulating film of an etching-resistant material;

forming an opening at a portion which is equivalent to a pressure receiving region of said insulating film such as to have a predetermined plane configuration; and forming a disappearing film of a predetermined configuration on said insulating film such as to cover said opening.

9. A method of manufacturing a semiconductor substrate according to claim 6, wherein said anisotropic liquid is potassium hydroxide water solution.

10. A method of manufacturing a semiconductor substrate according to claim 6, wherein said disappearing film is formed on the main surface along said pressure receiving region of said semiconductor substrate with projecting portions being provided around said disappearing film; and in said step of forming said etching hole, at least one etching hole is formed at a predetermined position except said pressure receiving region such as to penetrates through said insulating diaphragm film and reach said projecting portions of said disappearing film.

* * * * *